(12) United States Patent
Tatematsu

(10) Patent No.: US 7,543,540 B2
(45) Date of Patent: Jun. 9, 2009

(54) ASSEMBLY STRUCTURE

(75) Inventor: Shunji Tatematsu, Kyoto (JP)

(73) Assignee: Fontage Co., Ltd., Kyoto (JP)

( * ) Notice: Subject to any disclaimer, the term of this patent is extended or adjusted under 35 U.S.C. 154(b) by 102 days.

(21) Appl. No.: 11/719,364

(22) PCT Filed: Apr. 18, 2006

(86) PCT No.: PCT/JP2006/008096

§ 371 (c)(1),
(2), (4) Date: Jul. 6, 2007

(87) PCT Pub. No.: WO2006/115109

PCT Pub. Date: Nov. 2, 2006

(65) Prior Publication Data

US 2008/0076304 A1    Mar. 27, 2008

(30) Foreign Application Priority Data

Apr. 21, 2005 (JP) ............................ 2005-123698
Aug. 3, 2005 (JP) ............................ 2005-224912

(51) Int. Cl.
*H01R 13/502* (2006.01)
(52) U.S. Cl. .................................................. 108/192
(58) Field of Classification Search ............... 439/701; 211/189; 108/64, 192; 312/247
See application file for complete search history.

(56) References Cited

U.S. PATENT DOCUMENTS 3,834,549 A * 9/1974 Burg et al. .................. 211/189
4,527,490 A * 7/1985 Tipton et al. ................ 108/192

(Continued)

FOREIGN PATENT DOCUMENTS

JP          54-82780          6/1979

(Continued)

OTHER PUBLICATIONS

English Language Abstract of JP 2000-037236, Feb. 8, 2000.

(Continued)

*Primary Examiner*—Neil Abrams
*Assistant Examiner*—Phuong Nguyen
(74) *Attorney, Agent, or Firm*—Greenblum & Bernstein, P.L.C.

(57) ABSTRACT

An assembling structure, wherein an insert member is fixed to the outer surface of a column at a specified position, a receiving member is fixed to a support hole formed at the edge part of a structure beforehand, the portion of the column positioned above a position where the insert member is fixed is inserted, from a horizontal direction, into the receiving hole of the receiving member fitted to the edge part of the structure, and the insert member fitted to the outer surface of the column is fitted, from the lower side, to the receiving hole of the receiving member fitted to the support hole of the structure to assemble them integrally with each other. Or the insert member fitted to a panel or a column is fitted, from the lower side, to the receiving hole of the receiving member fitted to a shelf part to lock locking parts of approximately L-shape in plan view formed on the insert member to locking grooves of approximately L-shape in plan view formed in the receiving member so that the tapered surfaces of the insert member and the receiving member can be fixedly press-fitted against each other.

10 Claims, 38 Drawing Sheets

U.S. PATENT DOCUMENTS

| | | | | |
|---|---|---|---|---|
| 5,247,250 | A * | 9/1993 | Rios | 324/754 |
| 5,579,703 | A * | 12/1996 | King | 108/186 |
| 5,695,205 | A * | 12/1997 | Liu | 280/79.2 |
| 5,924,581 | A * | 7/1999 | Chen | 211/187 |
| 6,502,708 | B2 * | 1/2003 | Daniel | 211/189 |
| 6,516,955 | B1 * | 2/2003 | Dudhwala et al. | 211/26 |
| 6,698,604 | B2 * | 3/2004 | Denny et al. | 211/189 |
| 6,742,664 | B2 * | 6/2004 | Rene et al. | 211/189 |
| 7,306,493 | B2 * | 12/2007 | Seo et al. | 439/751 |

FOREIGN PATENT DOCUMENTS

| | | |
|---|---|---|
| JP | 9-302818 | 11/1997 |
| JP | 2000-037236 | 2/2000 |
| JP | 2001-292837 | 10/2001 |
| JP | 3469161 | 9/2003 |

OTHER PUBLICATIONS

English Language Abstract of JP 2001-292837, Oct. 23, 2001.
English Language Abstract of JP 9-302818, Nov. 25, 1997.

* cited by examiner

ASSEMBLY STRUCTURE

TECHNICAL FIELD

The invention relates to an assembly structure used in assembling of outdoor structure such as shelf, rack, table, or box.

BACKGROUND ART

In a conventional assembly structure, for example, a sleeve is attached to a an upright erect post outside, a collar is fitted to the sleeve attached to the post outside from the side of the post, and both ends of a holder provided at a corner of a shelf plate is extended laterally by resisting the elasticity. Further, both end bumps of the holder are fitted into the recesses formed at the collar lateral side from the side of the collar and are engaged with the both lateral recesses of the collar, and the holder is mounted and assembled on the protrusion protruding to the lower end side of the collar, and the assembly type shelf of patent document 1 is formed.

However, when attaching or detaching the holder on the collar lateral side, the both ends of the holder are extended laterally by resisting the elasticity, but if the holder is fitted to the collar from the side or from above, when a tensile stress is applied to the shelf plate having the holder and the post having the collar in the horizontal direction, the both ends of the holder are likely to be extended laterally by resisting the elasticity, and the collar may be detached from the holder, and sufficient structural strength for maintaining the assembled state of shelf may not be obtained.

In an assembly booth, alternatively, by mutually connecting protruding ends of edge clamps fixed to opposite edges of extension panel and corner panel, tightening and fixing with tightening members, edge clamps and tightening members are used for mounting shelf plates on braces fitted to the tightening members as disclosed in patent document 2.

However, after mutually connecting and fixing the protruding ends of edge clamps by rotating the operation levers of the tightening members fitted to the protrusions of the edge clamps, shelf plates must be mounted on the braces fitted to the tightening members, and it takes time and labor when attaching or detaching shelf plates, or when changing the height. For example, the tightening force of the tightening members is gradually lowered due to wear or deformation, and necessary strength for maintaining the assembly structure may not be obtained.

Patent document 1: Japanese Patent No. 3469161
Patent document 2: Japanese Patent Publication No. H9-302818

DISCLOSURE OF THE INVENTION

Problems to be Solved by the Invention

It is an object of first and second embodiments of the invention to present an assembly structure capable of attaching and detaching a structure easily, and fixing firmly and securely.

Means for Solving the Problems

An assembly structure in a first embodiment of the invention is an assembly structure for fitting and fixing insertion members attached to the post outside into receiving holes of receiving members provided in the structural body from beneath, in which the insertion member is fixed at specified position on the post outside, the receiving member is preliminarily fixed to a support hole of structural body edge, the post above the mounting position of insertion member is inserted into the receiving hole of receiving member fitted in the support hole of the structural body edge from the horizontal direction, the insertion member fitted to the post outside is fitted into the receiving hole of the receiving member fitted in the support hole of the structural body from beneath, and taper faces of insertion member and receiving member are mutually pressed and fixed integrally by making use of natural load applied to the structural body or weight of the structural body.

On the other hand, the post is pulled down, the structural body is lifted up, the insertion hole is drawn out from the receiving hole of the receiving member, and the post having the insertion member is drawn out from the receiving hole of the receiving member in the horizontal direction, and the post and the structural body are separated.

The post is a hollow or solid post having round, square, pentagonal, hexagonal, rectangular, or elliptical section. The structural body is, for example, plate-like or frame-like shelf, frame body, top plate, bottom plate, side plate, support body, or coupler. The structural body, insertion member, and receiving member are composed of single or compound material of aggregate, plywood, wood, metal, plastics or the like.

On the opposite sides of the post and insertion member, mutually engaged recess and bump are formed, and at least one of the recess and bump may be disposed at specified interval in the length direction along the outer side of the post.

That is, the recess (for example, hole or groove) and the bump (for example, protrusion or pin) formed in the opposite sides of the post and insertion member are mutually engaged, and the structural body can be defined at a height position for mounting the insertion member. The mounting position of insertion member may be changed to a desired position on the post, and the height of the mounting position of the structural body may be adjusted in gradual steps.

At least in lower end outer circumference or upper end outer circumference of the receiving member, a flange may be formed so as to abut against the circumferential edge of the support hole.

When fitting the insertion member and receiving member, the flange formed on the lower end outer circumference of the receiving member abuts against the lower end circumferential edge of the support hole formed in the structural body edge, and they are defined at specified fitting position.

The downside circumferential edge of the support hole formed in the structural body and the lower end outer circumference of the receiving member may be fixed integrally by means of fixing member.

When the post is inserted into the receiving hole of the receiving member provided in the structural body from the horizontal direction, or when the insertion member provided in the post is fitted into the receiving hole of the receiving member provided in the structural body from beneath, the receiving member will not drop out from the support hole of the structural body, and the assembling work is easy. The fixing member is not particularly specified, and includes, for example, screw, bolt, nail, magnet, adhesive, tacky agent, etc.

The receiving member may be divided into upper and lower halves, that is, an inner member fitted to the outer circumference of the insertion member, and an outer member fitted to the support hole of the structural body, and the inner member and outer member are formed in mutually matching shape.

The inner member is tightened in a direction pressed to the post outside, and the outer member is extended in a direction pressed to the post inside of the structural body, and the receiving member can be fixed firmly on the post outside and post inside of the structural body.

A tightening member may be provided so as to be engaged with the upper end of the insertion member projecting above the support hole of structural body, for applying a tightening force in a direction for mutually pressing the taper faces of the insertion member and receiving member.

The tightening member engaged with the upper end of the insertion member abuts against the receiving member, the insertion member is lifted up to the direction fitted into the receiving member by the tightening force of the tightening member, and the receiving member is pulled down by its reaction, and the taper faces of the insertion member and receiving member may be pressed mutually. That is, by the natural load applied to the structural body and the own weight of the structural body, a greater grip force is obtained than in the case of mutually pressing the taper faces of the insertion member and receiving member.

Or, a tightening member may be provided so as to be engaged with the lower end of the receiving member projecting below the support hole of structural body, and to abut against the insertion member projecting below the receiving hole of the receiving member, for applying a tightening force in a direction for mutually pressing the taper faces of the insertion member and receiving member.

The tightening member engaged with the lower end of the receiving member abuts against the insertion member, and the insertion member is pushed up in a direction to be engaged with the receiving member by the tightening force of the tightening member, and the taper faces of the insertion member and receiving member are pressed against each other. That is, a greater grip force is obtained than in the case of mutually pressing the taper faces, and the post and structural body can be firmly fixed without allowing looseness.

At the side of the tightening member, a notch may be formed in a vertical direction, being open in a width allowing to attach and detach the post in the horizontal direction.

If the insertion member and receiving member are fitted and fixed in a mutually engaged state by tightening force of tightening member, the post above the mounting position of the insertion member can be inserted into the receiving hole of the receiving member provided in the structural body edge from the notch in the horizontal direction.

The insertion member can be separated into a pair of split members formed in size and shape conforming to the semi-circumferential direction of the post.

Since the pair of split members are mutually matched and fixed to the outer circumference of the post from the horizontal direction, it is easy to change the mounting position of the insertion member.

The insertion member may be also formed in a C-shape as seen from the plane opened at one side edge, and both ends at the opening side of the insertion member may be formed so as to be extended in a radial direction at an interval wider than the outside diameter of the post.

While extending the both ends at the opening side of the insertion member in a radial direction at an interval wider than the outside diameter of the post, the insertion member is fitted to the post outside, and the receiving member fitted to the structural body is inserted into the outer side of the insertion member fitted to the post outside, and hence the both ends at the opening side of the insertion member are prevented from extending in the radial direction.

An assembly structure in a second embodiment of the invention is an assembly structure for fitting and fixing insertion members attached to one structural body into receiving holes of receiving members provided in other structural body, in which the insertion member of one structural body is inserted into the receiving hole of the receiving member of other structural body from beneath, and both ends of either one member of insertion member and receiving member are mutually engaged with a pair of stopping parts folded in an L shape in plan view by mutually engaging with a pair of stopping grooves formed in other member corresponding to the stopping parts, thereby preventing from slipping out in separated and blocked state in horizontal direction.

By the natural load applied to the structural body or the weight of the structural body, the taper faces of each stopping part outside and each stopping groove inside are pressed each other and fixed integrally. Or one structural body is pulled down and other structural body is lifted up, and the stopping parts of the insertion member are drawn out from the stopping grooves of the receiving members, and the structural body at the insertion member side and the structural body at the receiving member side are separated.

The structural body is, for example, panel, shelf plate, bottom plate, top plate, side plate, or hollow or solid post.

The outside of the insertion member may be formed in a taper shape so as to be narrow from lower end side to upper end side, and the inside of the receiving hole of the receiving member conforming to the insertion member may be formed in a taper shape so as to be narrow from the lower end side to the upper end side corresponding to the insertion member.

The insertion member provided in one structural body may be inserted in the receiving hole of the receiving member provided in the support hole of other structural body from beneath, and the insertion member and receiving member are mutually fitted, and by the natural load applied to the structural body or the weight of the structural body, the taper faces of the outside of insertion member and inside of receiving hole of receiving member are mutually pressed, and fixed integrally.

Or one structural body is pulled down and other structural body is lifted up, and the insertion member is drawn out from the receiving hole of the receiving member, and the structural body at the insertion member side and the structural body at the receiving member side are separated.

Or the support hole having the support member is formed in a size and shape allowing the receiving member to be inserted from beneath, and the receiving member prevented from being attached or detached in the horizontal direction, and the post having the insertion member is formed in the structural body edge near the support hole so as to be attached and detached in the horizontal direction, and a notch opened in a width preventing the receiving member from being attached or detached in the horizontal direction may be formed in a vertical direction by communicating with the support hole.

The receiving member is inserted in the support hole formed in the edge of the structural body from beneath, and the insertion member and receiving member may be prevented from slipping out in separated and blocked state in horizontal direction.

At the side of the receiving member corresponding to the structural body edge, the post having the insertion member is allowed to be attached and detached in horizontal direction, and a notch opened in a width preventing the insertion member from being attached or detached in the horizontal direction may be formed in a vertical direction by communicating with the receiving hole.

The post projecting above the insertion member may be inserted in the receiving hole of the receiving member from the notch in horizontal direction, or drawn out from the receiving hole in the horizontal direction, so that the insertion member and receiving member can be attached and detached.

At the opposite sides of the insertion member and structural body, mutually engaged holes and protrusions are formed, and at least one of the hole and protrusion may be formed in a plurality of positions at specified interval in the length direction along the outside of the structural body.

By mutually engaging with the holes and protrusions formed on the opposite sides of the insertion member and structural body, the structural body may be defined at a height position for mounting the insertion member. The mounting position of insertion member may be changed to a desired position on the post, and the mounting position of the structural body may be adjusted in gradual steps of height.

One structural body having the insertion member may be fixed in a state projecting outside of the edge of other structural body having the receiving member.

As a result, the structural body having the insertion member may not be interfering, and the upper and lower sides of the structural body having the receiving member may be utilized effectively.

At the lower end outside of the receiving member, a flange to be engaged with the circumferential edge of the support hole may be formed.

The flange of the receiving member may be stopped to or engaged with the circumferential edge of the support hole formed in the structural body, and the structural body mounted on the flange of the receiving member may be held horizontally.

The flange of the receiving member and the lower side of the structural body mounted on the flange may be fixed integrally by fixing means.

Hence, there is no risk of receiving member dropping out of the support hole of structural body, when inserting the insertion member attached to one structural body into the receiving hole of the receiving member attached to other structural body from beneath, or when inserting one structural body into the receiving hole of the receiving member. The fixing member may be realized, for example, by screw, bolt, nail, magnet, adhesive, tacky agent, etc.

Effects of the Invention

In the first embodiment of the invention, the post above the mounting position of the insertion member is inserted into the receiving hole of the receiving member provided in the structural body edge, and the insertion member provided in the post outside is fitted into the receiving hole of the receiving member provided in the structural body edge from beneath. That is, if tensile stress is applied to the post and the structural body in the horizontal direction, the insertion member is not drawn out from the receiving member in the horizontal direction, and firm and rigid fixing is realized in a simple structure.

By pulling down the post and lifting up the structural body, the insertion member is drawn out from the receiving hole of the receiving member and the post is drawn out from the receiving hole of the receiving member in the horizontal direction, and it saves the labor of drawing out the upper side structural body from the post, and it is easy to detach or attach the structural body, or to change or adjust the mounting position of the structural body.

In the second embodiment of the invention, the insertion member provided in one structural body is inserted into the receiving hole of the receiving member provided in other structural body from beneath, and a pair of stopping parts of L-shape in plan view formed in either member of insertion member and receiving member are mutually engaged with a pair of stopping grooves formed in other member, and therefore the pressing sides of the stopping parts and stopping grooves are many, so as to be pressed in plural directions including the longitudinal direction and lateral direction, and the separation suppressing force in the horizontal direction is great, and a sufficient engaging force is obtained for preventing separation of the structural bodies.

By the natural load applied to the structural body or the weight of the structural body, a pair of stopping parts folded in L-shape in plan view and a pair of stopping grooves corresponding to the stopping parts are mutually pressed at the taper faces, and the contact resistance occurring on the pressing sides of stopping parts and stopping grooves is increased, and two structural bodies can be fixed firmly and securely.

In the first and second embodiments, if there is a slight error in mounting precision of post and structural body, by mutually fitting the taper faces of the insertion member and receiving member, it is possible to fix in a state free from looseness. In addition, the precision error is absorbed or corrected, and it is optimum for combining members of different materials.

Description of the Reference Numerals

| | |
|---|---|
| 1, 1A | Structure |
| 2 | Post |
| 2a | Hole |
| 2B | Panel |
| 2Ba | Hole |
| 3B | Shelf |
| 7, 7A, 7B | Structural body |
| 7a, 3Ba | Support hole |
| 7b, 3Bb | Notch |
| 8, 8B | Insertion member |
| 8a, 8Ba | Split member |
| 8b | Protrusion |
| 8c | Male thread |
| 8Bb | Stopping part |
| 8Bd | Protrusion |
| 8Bf | Stopping groove |
| 9, 9B | Receiving member |
| 9a, 9Ba | Receiving hole |
| 9b, 9Bc | Notch |
| 9c | Inner member |
| 9d | Outer member |
| 9e | Hole |
| 9F | Male thread |
| 9Bb | Stopping groove |
| 9Bf | Stopping part |
| 9A, 9B | Flange |
| 10, 23 | Screw |
| 12, 13 | Tightening member |
| 12b, 13b | Notch |

BEST MODE FOR CARRYING OUT THE INVENTION

The first embodiment of the invention has achieved the object of detaching and attaching the structural body simply and easily, and fixing firmly and securely, by inserting the post having the insertion member into the receiving hole of the receiving member attached to the structural body edge from the notch in the horizontal direction, and fitting the insertion member into the receiving hole of the receiving member from beneath.

The second embodiment of the invention has achieved the object of detaching and attaching the structural body simply and easily, and fixing firmly and securely, by inserting the insertion member attached to a first structural body into the receiving hole of the receiving member attached to other structural body from beneath, and mutually engaging a pair of stopping parts formed in one member of insertion member and receiving member, and a pair of stopping grooves formed in other member.

EMBODIMENT 1

Figure 1:
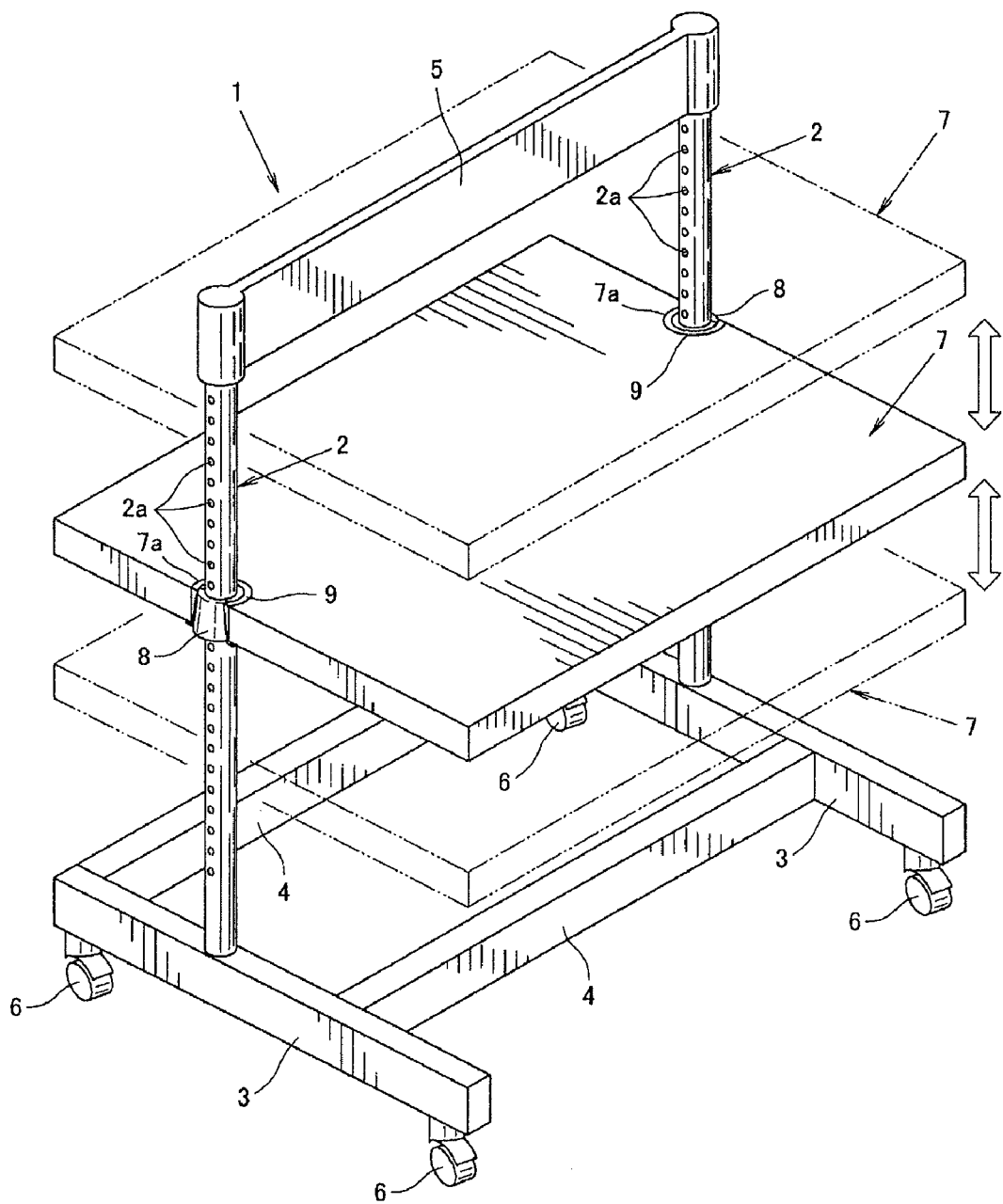
FIG. 1 is a perspective view of assembly example of structural body by assembly structure in a first embodiment.
Figure 2:
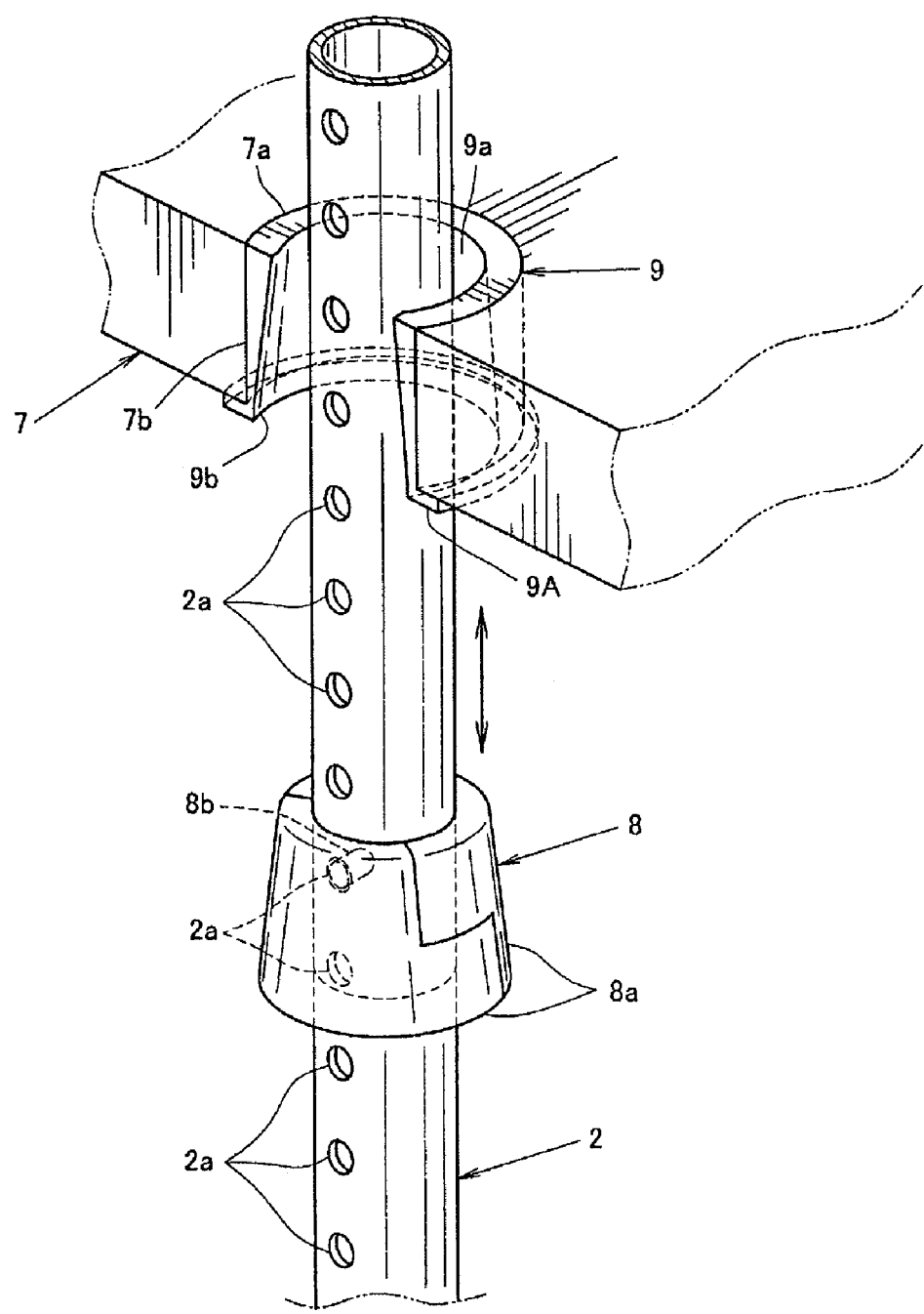
FIG. 2 is a perspective view showing a fitting method of insertion member and receiving member.

FIG. 1 and FIG. 2 show an assembly structure of the first embodiment, in which circular trapezoidal insertion members 8, 8 as seen from the side attached to the outside of posts 2, 2 for composing a structure 1 are fitted to C-shaped receiving members 9, 9 as seen from the plane attached to both side edges of the shelf-like structural body 7 from beneath, and they are assembled without using any tool. In the embodiment, the insertion member 8 and receiving member 9 are made of same material, but they may be also made of different materials.

The hollow posts 2, 2 for composing the structure 1 are erect upright toward the immediately upward direction to the center of the upside of the right and left frame bodies 3, 3.

At both outer sides of the posts 2, 2, concave holes 2a, for stopping protrusions 8b, 8b formed in the insertion member 8 described later are disposed at specific equal intervals in the length direction along the outside of the hollow post 2 formed in a round section as seen from the plane.

Two frame bodies 4, 4 are set up parallel between the frame bodies 3, 3, and a coupler 5 is set up horizontally between upper ends of frame bodies 3, 3, and the structure 1 mounting the shelf-like structural body 7 is constituted.

At both lower ends of the frame bodies 3, 3, casters 6 . . . with stopper function freely rotatable in desired direction (for example, about 360 degrees) are provided. Without using casters 6, the structure 1 may be installed directly in a desired place.

Figure 3:
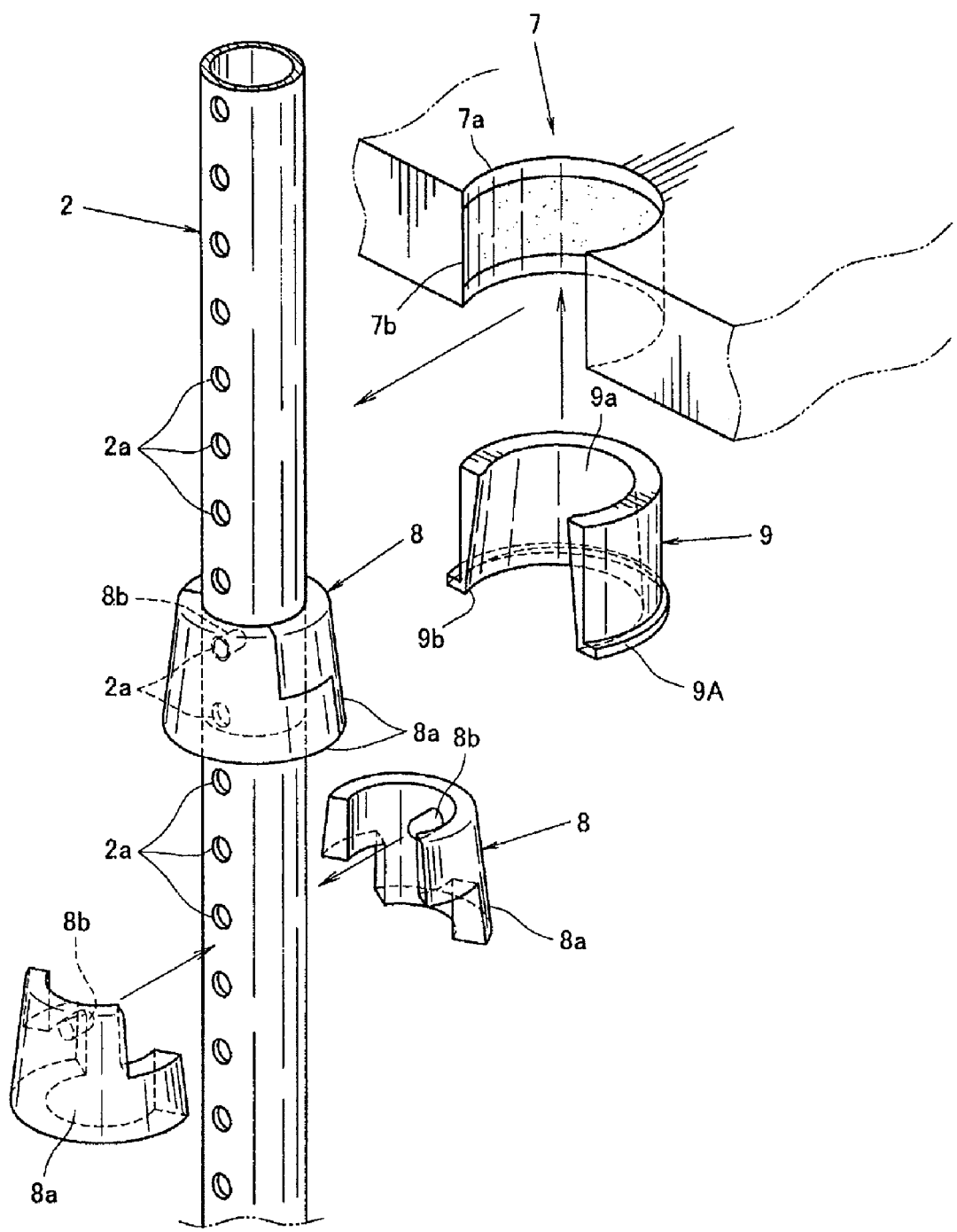
FIG. 3 is a perspective view showing a mounting method of insertion member and receiving member.
Figure 6H:
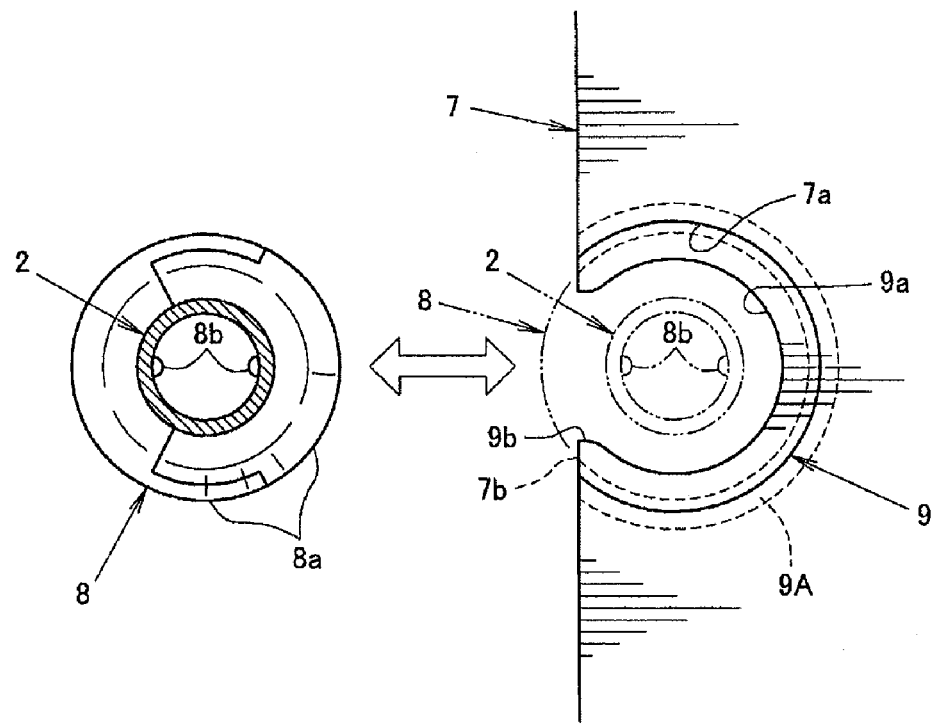
FIGS. 6 H and I are plan views showing a fitting method of insertion member and receiving member.
Figure 6I:
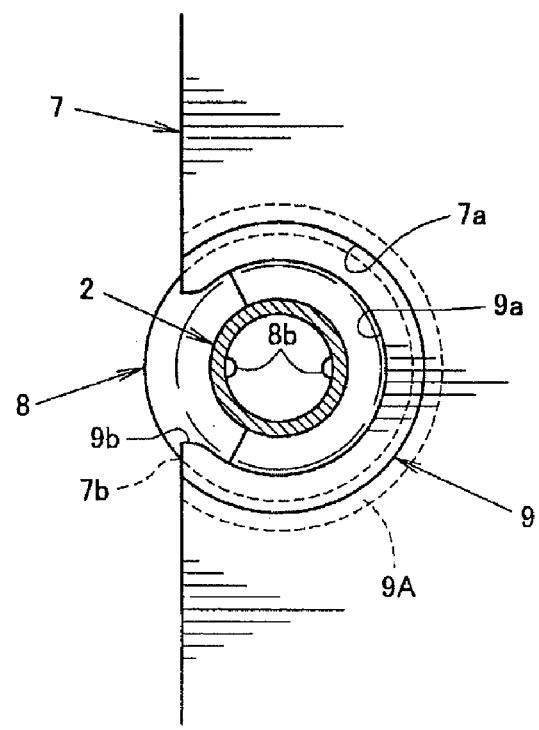

At both edges of the structural body 7, as shown in FIG. 3 and FIGS. 6 H and I, the receiving member 9 to be described later is formed in a size and shape to be fitted from beneath, and the receiving member 9 has a C-shaped support hole 7a as seen from plane so as to be prevented from being attached or detached in the horizontal direction.

Notches 7b opened at both edges near the support holes 7a, 7a are opened in size and shape allowing the posts 2 to be attached and detached freely in the horizontal direction, and a notch is formed in vertical direction by communicating with the support hole 7a in a width for arresting the receiving member 9 to be attached or detached in the horizontal direction.

Figure 4D:
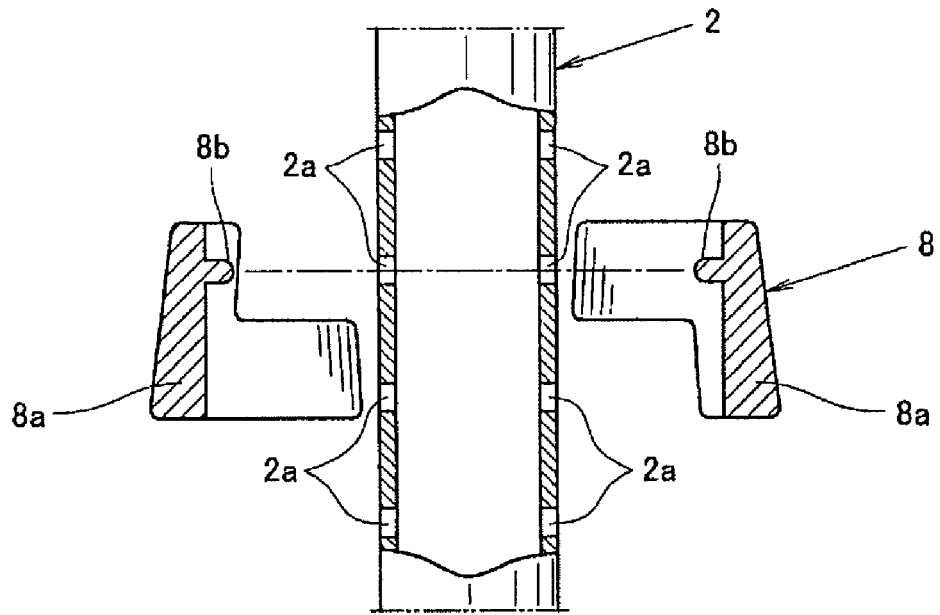
FIGS. 4 D and E are sectional views showing a mounting method of insertion member.
Figure 4E:
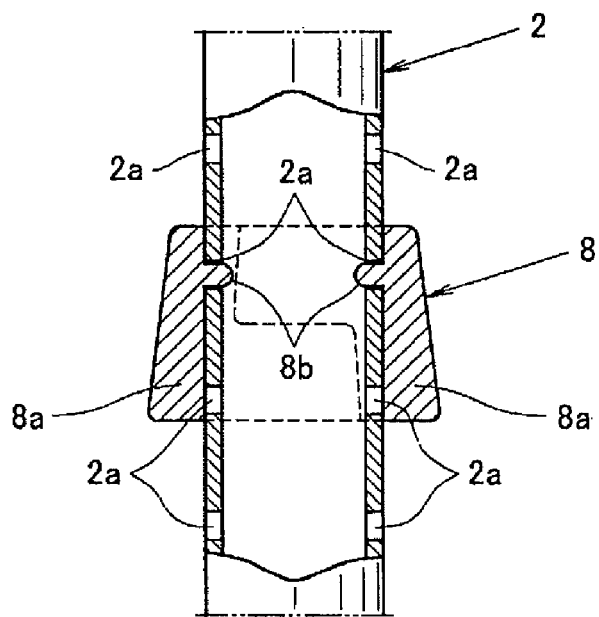

The insertion member 8 is separated into a pair of split members 8a, 8a, as shown in FIGS. 4 D and E, in size and shape conforming to the semicircumferential surface (for example, ½ outer circumference) of the post 2.

The outer circumference of the insertion member 8 consisting of split members 8a, 8a is formed in size and shape conforming to the receiving hole 9a of the receiving member 9 described later, and is formed in a taper profile increasing from the upper side smaller end to the lower side larger end corresponding to the inner circumference of the receiving hole 9a.

Convex protrusions 8b, 8b formed in the inner circumference of the split members 8a, 8b are stopped in the radial direction in the holes 2a, 2a at the same height formed in both outer circumferences of the post 2 when the split members 8a, 8a are mounted on the both outer circumferences of the post 2, and the inner circumference of split members 8a, 8a are formed in a radius of curvature corresponding to the outer circumference of the post 2.

The opposite ends of the split members 8a, 8a are formed in a stepped shape so as to be engaged with each other, thereby preventing position deviation in vertical direction due to mutual engagement when mounted on the outer circumference of the post 2, and the assembled state in circular trapezoidal form as seen from the side is maintained.

At least one side of outer circumferences of posts 2, 2 and inner circumference of split members 8a, 8a may be roughened to have a large contact resistance to prevent from sliding, or may be coated with synthetic rubber or the like to prevent from sliding.

On the other hand, holes 2a . . . of the posts 2 are formed at specific equal intervals in the length direction along the both outer circumferences of the posts 2, and protrusions 8b, 8b of split members 8a, 8b are stopped in holes 2a, 2a at desired position formed in the posts 2, so that the structural body 7 described later may be defined and changed at a position of mounting the insertion member 8.

A plurality of such protrusions may be disposed at specific equal intervals in the overall length on the outer circumference of the posts 2, and the hole for stopping any one protrusion may be provided in the inner circumference of the split members 8a, 8a.

As other positioning means replacing the hole 2a and protrusion 8b, protrusions 8b, 8b of split members 8a, 8a may be stopped in grooves or recesses at desired height positions formed at specific equal intervals in the overall length on the outer circumference of the posts 2.

Alternatively, screws of the split members 8a, 8a may be stopped in the holes 2a (or grooves or recesses) of the posts 2, or the screws may be positioned by abutting against the outer circumference of the posts 2.

Figure 5F:
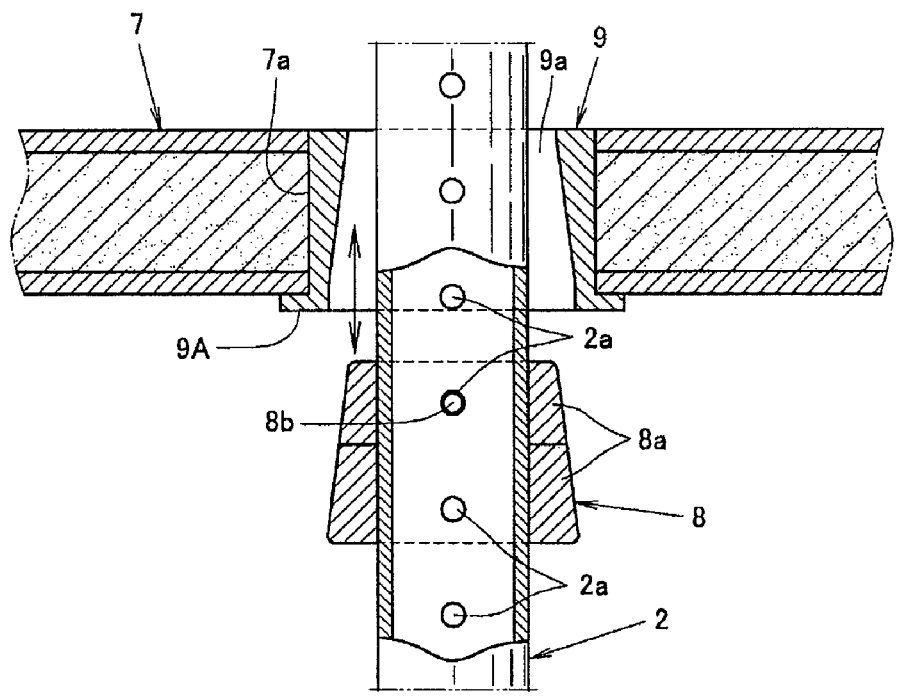
FIGS. 5 F and G are sectional views showing a fitting method of insertion member and receiving member.
Figure 5G:
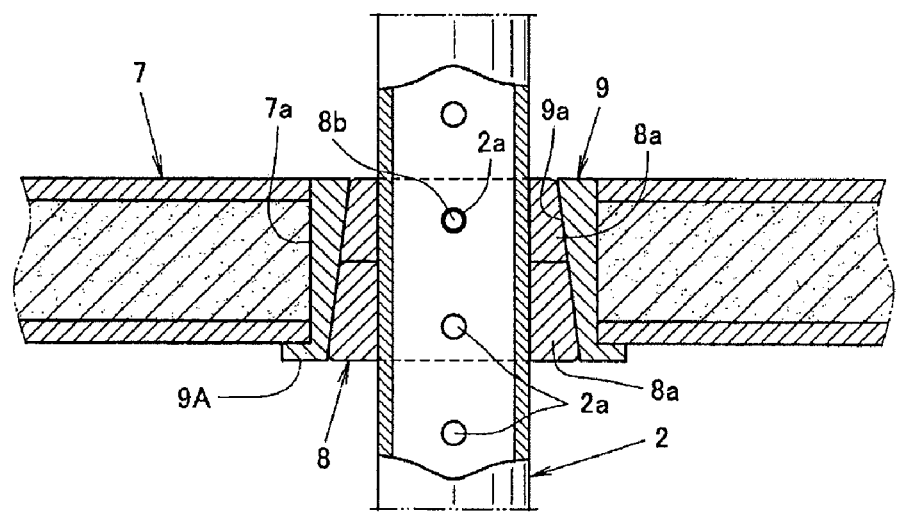

The receiving member 9 is formed in size and shape conforming to the support hole 7a of the structural body 7 as shown in FIGS. 5 F and G, and is designed to be fitted into the support hole 7a from beneath.

Moreover, the inner circumference of the receiving hole 9a formed in the center of the receiving member 9 is formed in size and shape conforming to the outer circumference of the insertion member 8, and is formed in a taper profile increasing from the upper side smaller end to the lower side larger end corresponding to the outer circumference of the insertion member 8.

The notch 9b opened at one edge of the receiving member 9 is opened in size and shape allowing the post 2 to be attached and detached in the horizontal direction, and a notch is formed in vertical direction by communicating with the receiving hole 9a in a width for preventing the insertion member 8 from being attached or detached in the horizontal direction.

A brim-like flange 9A formed continuously in the circumferential direction along the lower end outer circumference of the receiving member 9 abuts against the lower end peripheral edge of the support hole 7a formed in the structural body 7 from beneath. The flange 9A may be formed partially across a specified interval in the circumferential direction along the lower end outer circumference of the receiving member 9.

The illustrated embodiment has such configuration, and the assembling method of the structure 1 by the assembly structure of the first embodiment is described below.

First, as shown in D and E in FIG. 3 and FIG. 4, when the shelf-like structural body 7 is mounted at desired height position of posts 2, 2 composing the structure 1 (see FIG. 1), the insertion member 8 is divided into two split members 8a, 8a, and attached to both outer circumferences of the posts 2. The protrusions 8b, 8b formed in the inner circumference of the split members 8a, 8a are inserted into holes 2a, 2a at same height formed on both outer circumferences of the posts 2 from both sides, and the pair of split members 8a, 8a are matched and fixed, and the height position for mounting the structural body 7 is determined.

Further, the notch 7b of the support hole 7a formed in the structural body 7, and the notch 9b of the receiving hole 9a formed in the receiving member 9 are matched so that the posts 2 may be allowed to be attached or detached in the horizontal direction (or sideways).

Next, as shown in F and G in FIG. 2 and FIG. 5, the receiving member 9 is preliminarily fitted and fixed in the support holes 7a, 7a formed at both edges of the structural body 7 from beneath, and when the structural body 7 is inserted between the posts 2, 2, one post 2 having the insertion member 8 is inserted into the receiving hole 9a of the receiving member 9 attached to one edge of the structural body 7 from the horizontal direction. Later, the other post 2 having the insertion member 8 is inserted into the receiving hole 9a of the receiving member 9 attached to other edge of the structural body 7 from the horizontal direction.

As shown also in H and I in FIG. 6, the structural body 7 in horizontal position is lowered, and the insertion members 8, 8 attached to the posts 2, 2 are fitted into the receiving holes 9a, 9a of the receiving members 9, 9 attached to the support holes 7a, 7a at both edges of the structural body 7 from beneath. The insertion members 8, 8 and receiving members 9, 9 are mutually matched and fixed, and the shelf-like structural body 7 can be mounted in a singularity or a plurality at desired height position of posts 2, 2.

By making use of the natural load applied to the structural body 7 or the weight of the structural body 7, the taper faces of the insertion member 8 and receiving member 9 are mutually pressed, and a gripping force necessary for mutually matching and fixing can be obtained, so that the posts 2, 2 and the structural body 7 can be fixed in tight state.

By the reaction generated at the time of pressing, the split members 8a, 8a of the insertion member 8 are tightened in the radial direction, and the split members 8a, 8a are pressed in the radial direction against outer circumference of the post 2, and enough contact resistance for maintaining the structural body 7 in mounted state at desired height position on the posts 2, 2 is obtained, and the structure 1 shown in FIG. 1 is assembled.

Thus, the post 2 above the mounting position of the insertion member 8 is inserted into the receiving hole 9a of the receiving member 9 attached to the support hole 7a of the edge of the structural body 7 from the notch 9b in the horizontal direction, and the insertion member 8 is fitted and fixed in the receiving hole 9a of the receiving member 9 from beneath, and if tensile stress is applied to the post 2 and structural body 7 in the horizontal direction, the insertion member 8 is not drawn out from the receiving member 9 in the horizontal direction, and firm and rigid fixing is realized while the structure is simple.

Besides, since the insertion member 8 and receiving member 9 are made of same material, the shrinkage rate and expansion rate are the same, and gap is hardly formed between the insertion member 8 and receiving member 9, and they can be fixed in tight state.

The post 2 is pulled down and the structural body 7 is lifted up, the insertion member 8 is drawn out from the receiving hole 9a of the receiving member 9, and then the post 2 is drawn out from the receiving hole 9a by way of the notch 9b in the receiving member 9 in the horizontal direction, and it saves the time and labor for drawing out the upper side structural body 7 from the post 2, and it is simple and easy to attach or detach the structural body 7 at desired mounting position, or change or adjust the mounting position of the structural body 7.

If there is a slight error in mounting precision of post 2 and structural body 7, by mutually fitting the taper faces of the insertion member 8 and receiving member 9, they can be fixed firmly without looseness. Besides, the precision error can be absorbed or corrected, members of different materials can be also combined.

Figure 7:
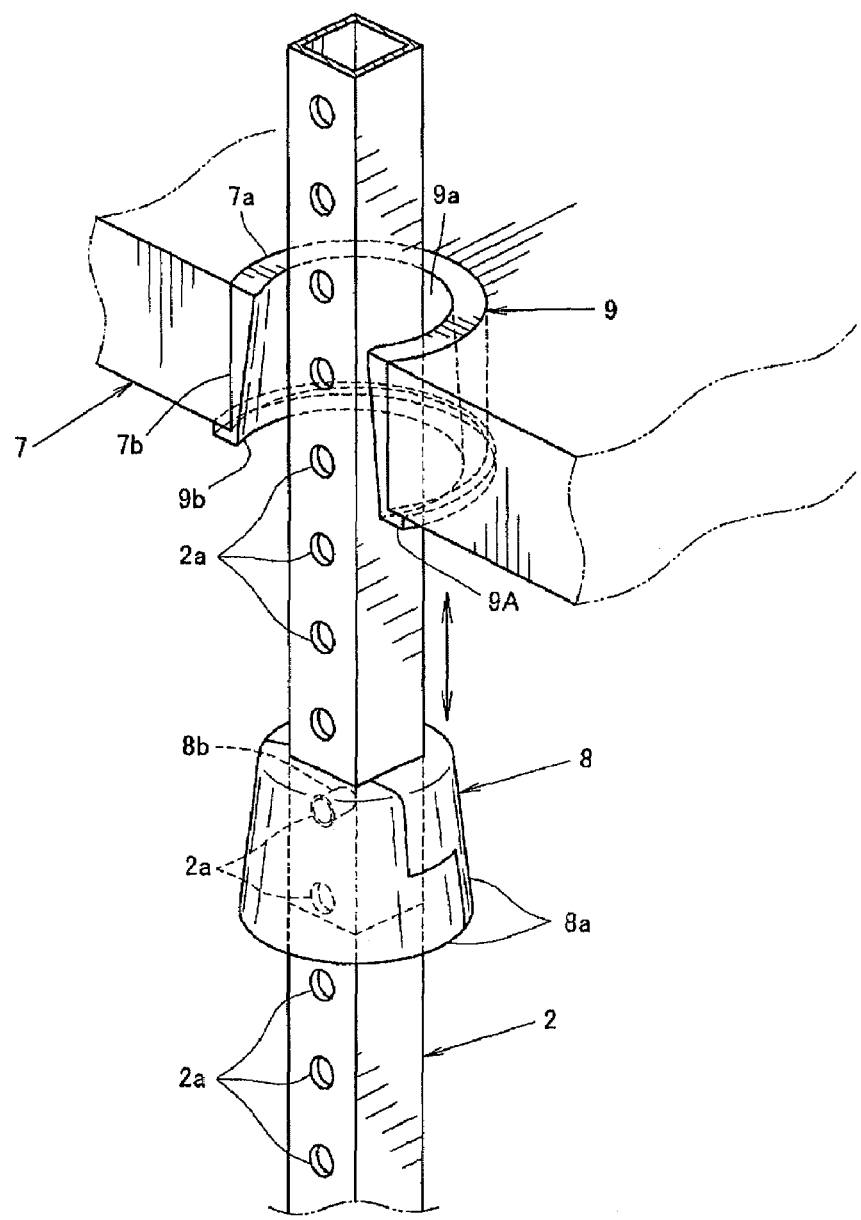
FIG. 7 is a perspective view showing an example of mounting a circular trapezoidal insertion member on a square post.

In other example of post 2 having other sectional shape than round section, as shown in FIG. 7, an insertion member 8 of circular trapezoidal section mounted on a post 2 of square section, and a receiving member 9 mounted on a structural body 7 corresponding to the outside shape of the insertion member 8 are mutually fitted and fixed.

Figure 8:
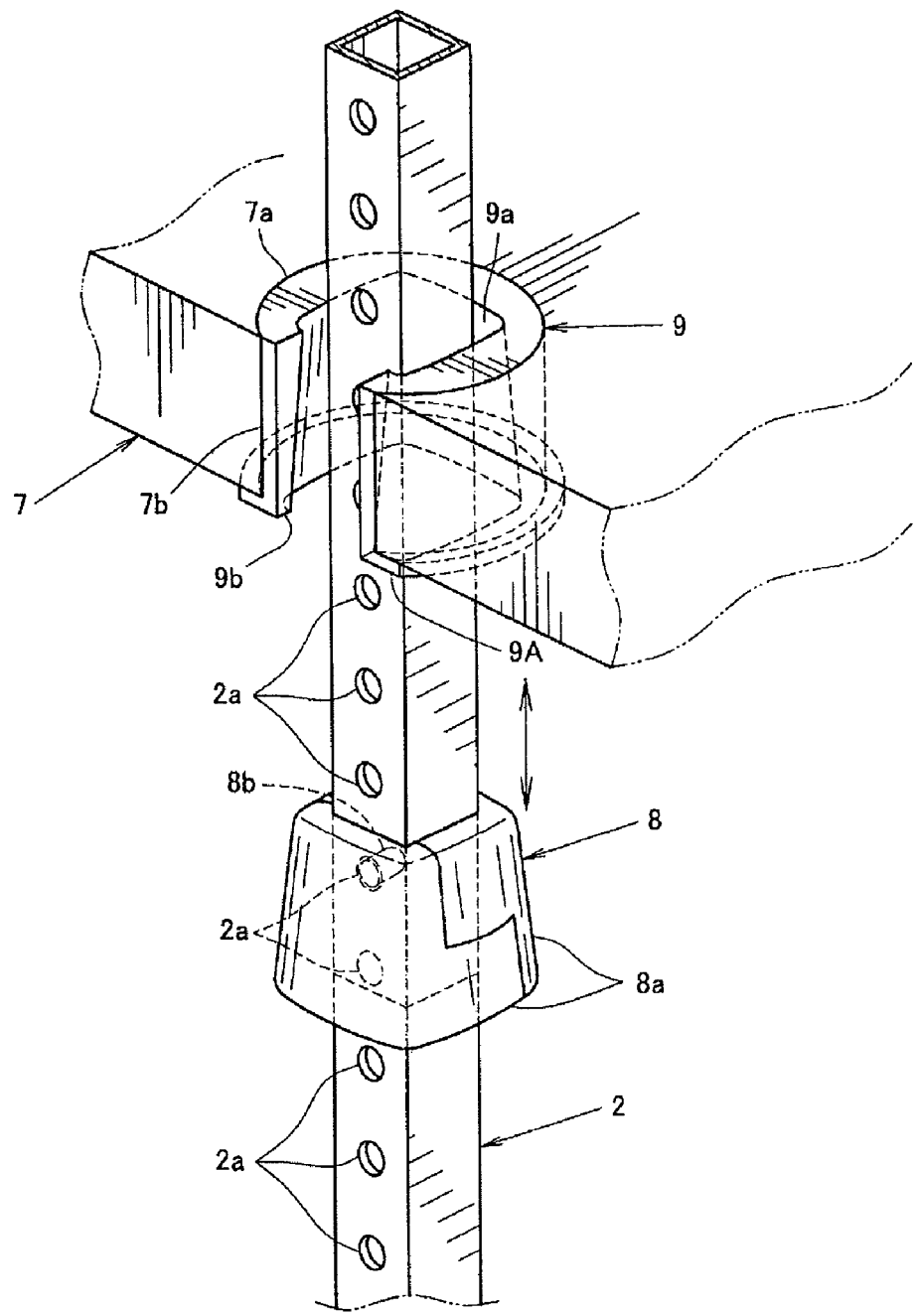
FIG. 8 is a perspective view showing an example of mounting a square trapezoidal insertion member on a square post.

Further, as shown in FIG. 8, an insertion member 8 of square trapezoidal section mounted on a post 2 of square section, and a receiving member 9 mounted on a structural body 7 corresponding to the outside shape of the insertion member 8 are mutually fitted and fixed.

Figure 9:
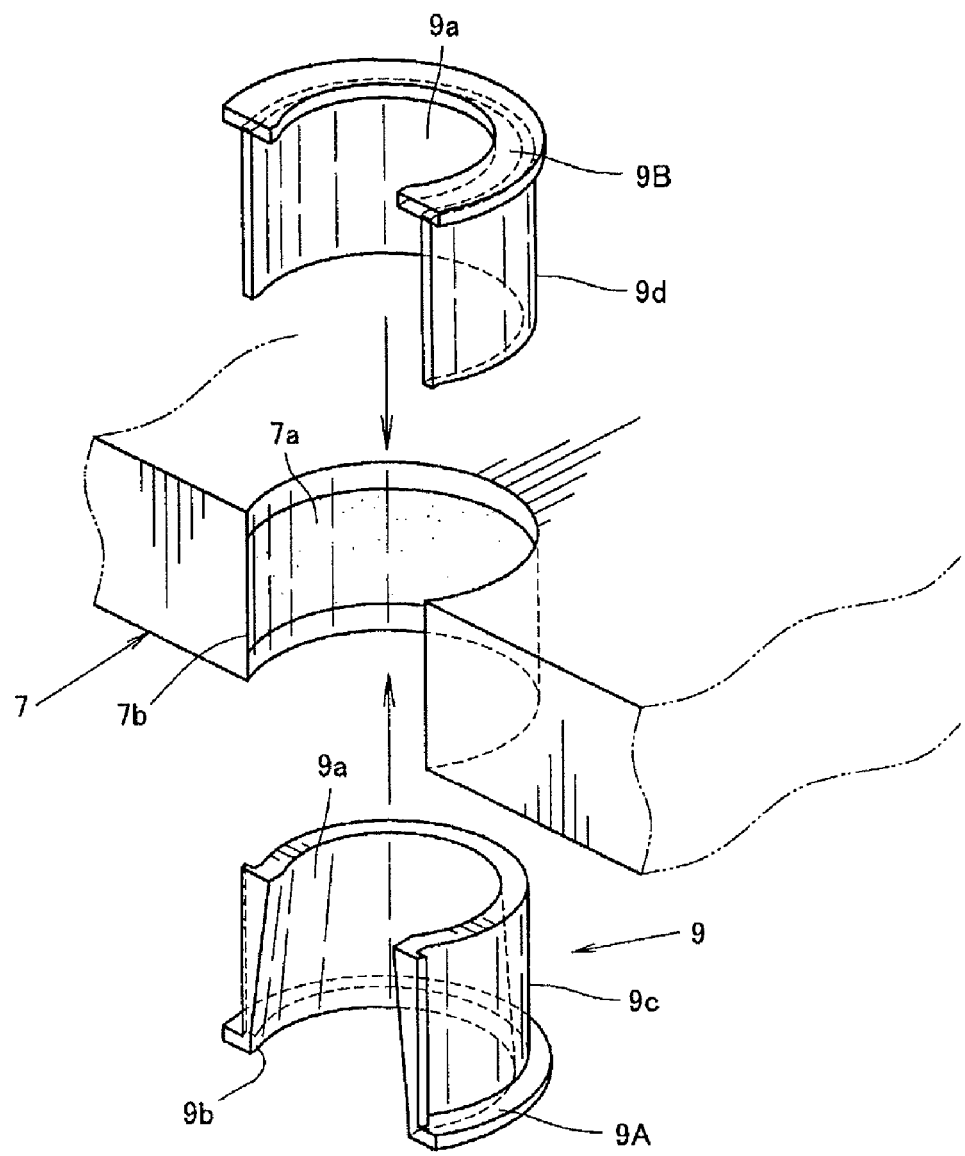
FIG. 9 is a perspective view of structure of receiving member separated into lower and upper halves.

FIG. 9 shows an assembly structure having the receiving member 9 split vertically into inner member 9c and outer member 9d, in which the inner member 9c is fitted into the support hole 7a of the structural body 7 from beneath, the outer member 9d is fitted into the support hole 7a of the structural body 7 from above, and they are mutually matched and fixed by forcing or pressing, and flanges 9A, 9B formed on the outer circumference of inner member 9c and outer member 9d are fitted and attached to the upper and lower peripheral edges of the support hole 7a.

Then, similarly, the insertion member 8 attached to the post 2 and the receiving member 9 attached to the structural body 7 are mutually fitted and fixed, and the same action and effect as in embodiment 1 are obtained. Alternatively, the inner member 9c is tightened in a direction to be pressed against the outer side of the post 2, and the outer member 9d is extended in a direction to be pressed against the inner side of the support hole 7a of the structural body 7, and the receiving member 9 can be firmly fixed to the outer side of the post 2 and the inner side of the support hole 7a of the structural body 7.

Figure 10:
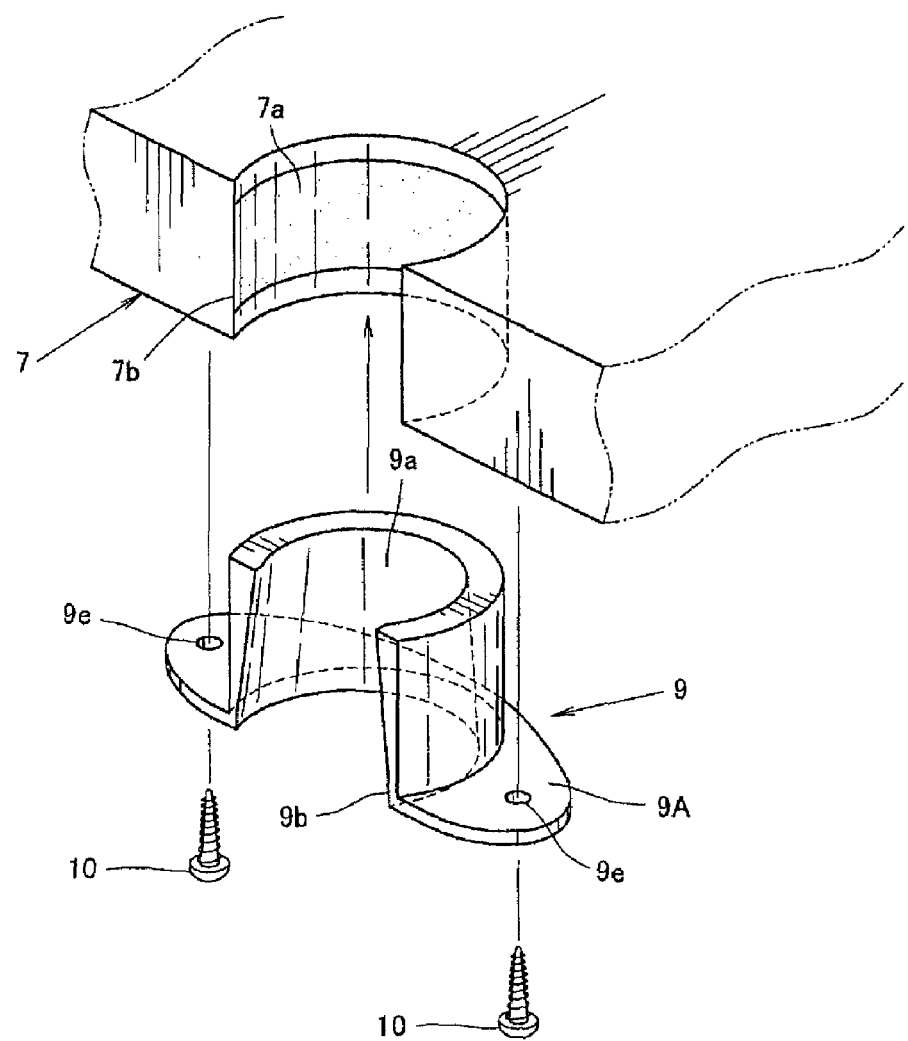
FIG. 10 is a perspective view of structure of receiving member fixed on the downside of structural body.

FIG. 10 shows an assembly structure having the receiving member 9 fixed integrally on the lower side of the edge of the structural body 7, in which two screws 10, 10 are used as fixing members, and are fixed integrally by screwing into the lower peripheral edge of the support hole 7a formed in the structural body 7 by way of holes 9e, 9e formed in flanges 9A, 9A of the receiving member 9.

Then, similarly, the insertion member 8 attached to the post 2 and the receiving member 9 attached to the structural body 7 are mutually fitted and fixed, and the same action and effect as in embodiment 1 are obtained.

Figure 11:
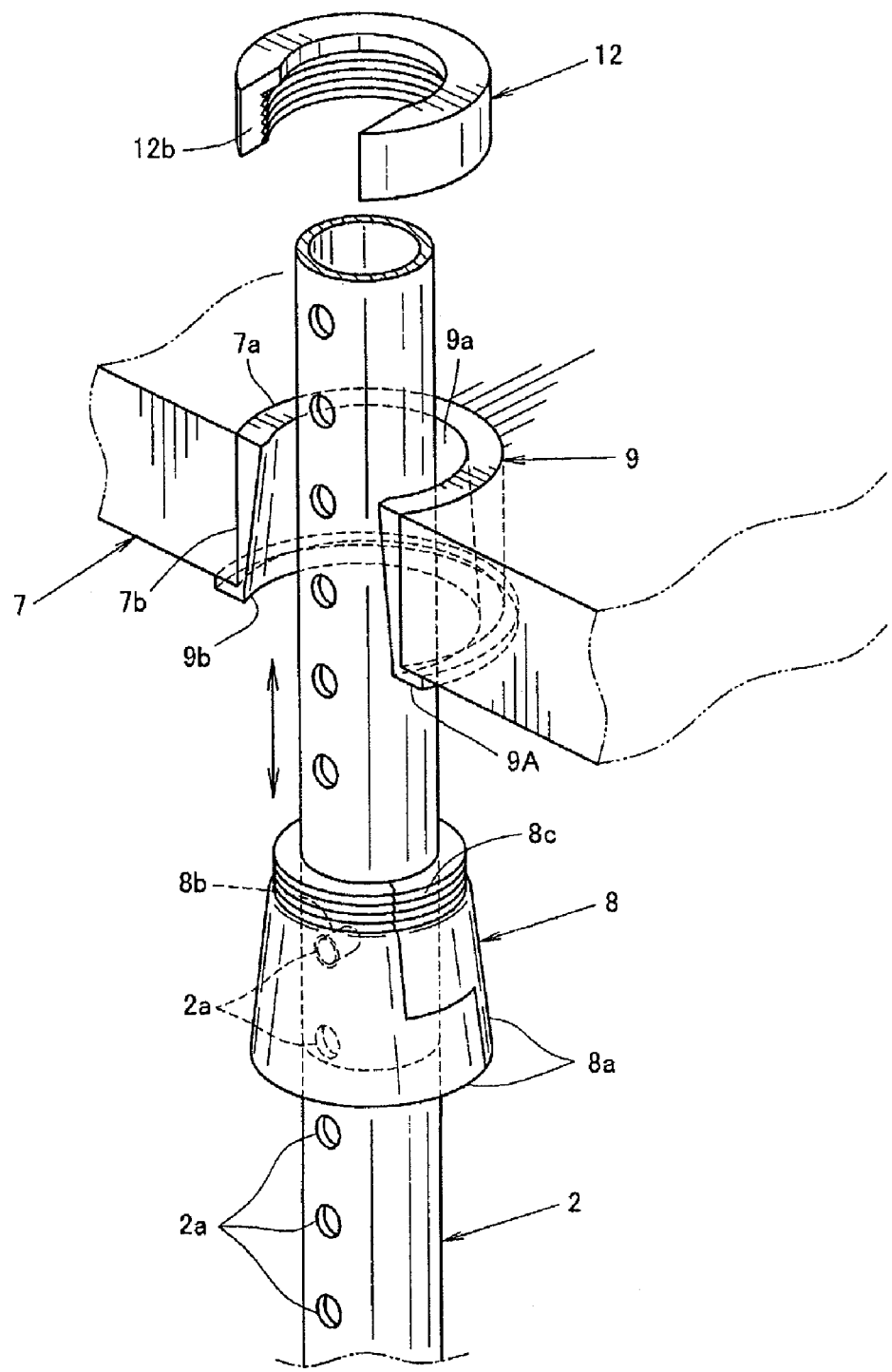
FIG. 11 is a perspective view of structure of tightening member engaged with insertion member.
Figure 12:
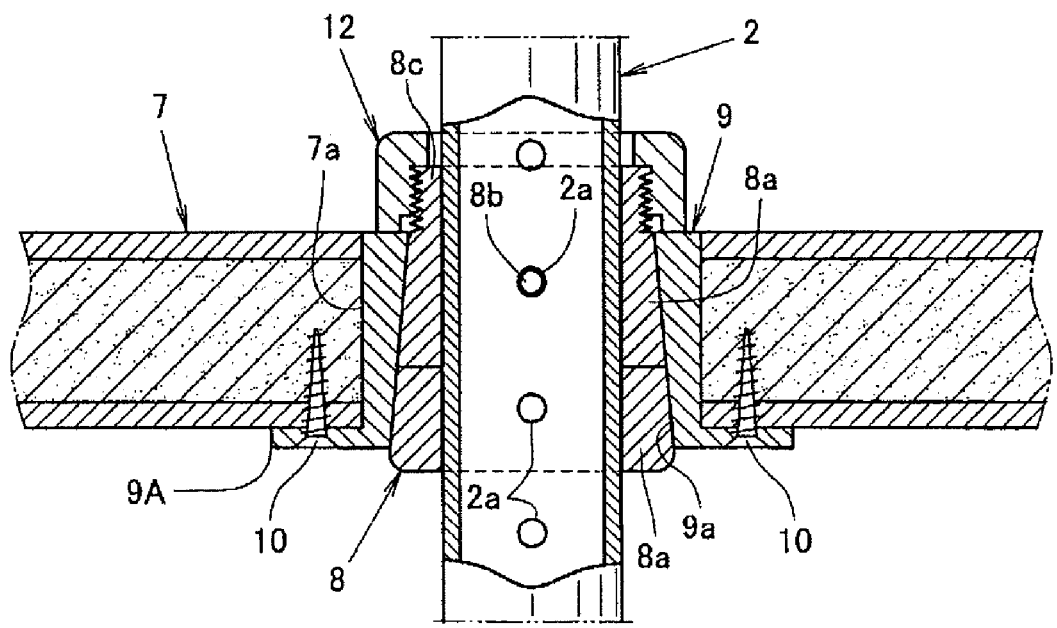
FIG. 12 is a sectional view showing a fitting state of insertion member and receiving member in FIG. 11.

FIG. 11 and FIG. 12 show another example of assembly structure having a tightening member 12 engaged with male threads 8c formed at the upper end side of the insertion member 8 protruding above the support hole 7a of the structural body 7, with the insertion member 8 and receiving member 9 tightened and fixed in a direction of mutually pressing the taper faces, in which the post 2 is allowed to be attached or detached in the horizontal direction at the side of the tightening member 12, and a notch 12b is opened in a vertical direction in a width enough for preventing the insertion member 8 from being attached or detached in the horizontal direction.

That is, the tightening member 12 attached from the side of the post 2 is engaged with the male threads 8c of the insertion member 8, and by the tightening force of the tightening member 12 abutting against the upper end of the receiving member 9, the insertion member 8 is lifted up in a direction to be fitted to the receiving member 9, and the receiving member 9 is pulled down by this reaction, and the taper faces of the insertion member 8 and receiving member 9 are pressed to each other. As a result, a larger gripping force is obtained than in a case of mutually pressing the taper faces of insertion member 8 and receiving member 9 by natural load, and the post 2 and structural body 7 can be fixed in tight state.

Figure 13:
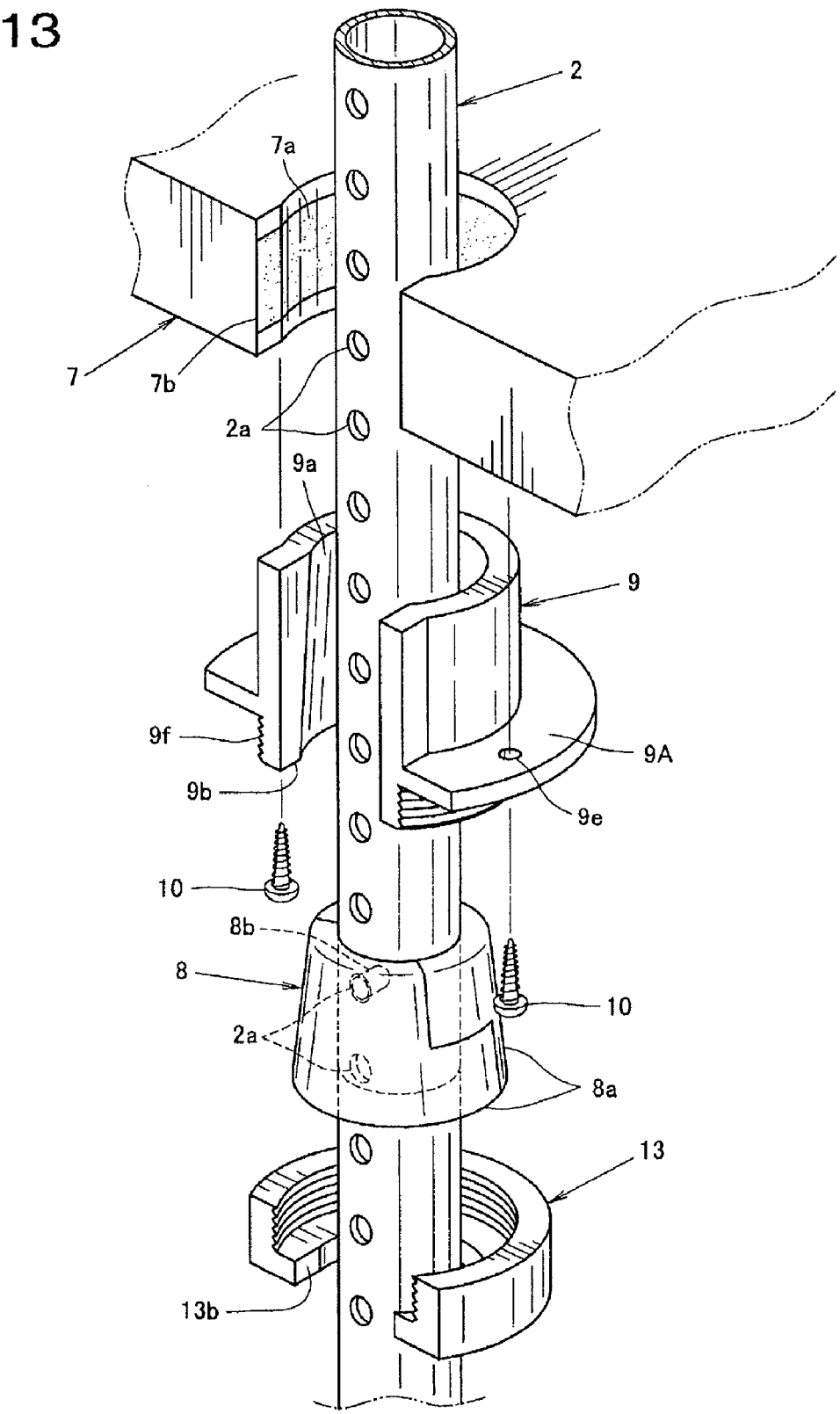
FIG. 13 is a perspective view of structure of engagement of tightening member and receiving member.
Figure 14:
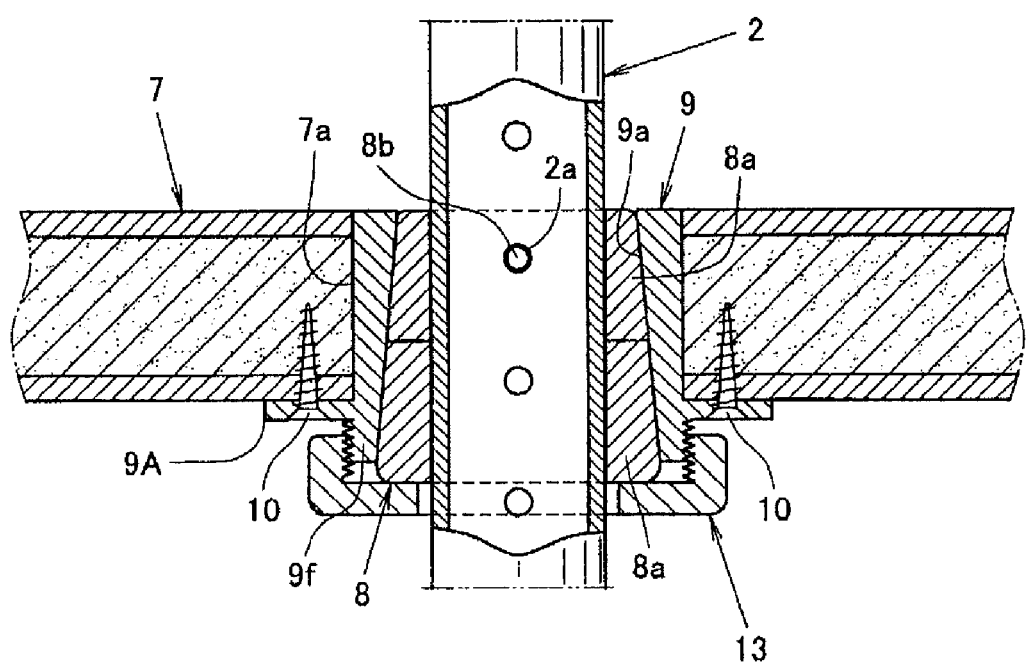
FIG. 14 is a sectional view of fitting state of insertion member and receiving member in FIG. 13.

FIG. 13 and FIG. 14 show another example of assembly structure having a tightening member 13 engaged with male threads 9f formed at the lower end side of the receiving member 9 protruding beneath the support hole 7a of the structural body 7, with the insertion member 8 and receiving member 9 tightened and fixed in a mutually pressed direction, in which the post 2 is allowed to be attached or detached in the horizontal direction at the side of the tightening member 13, and a notch 13b is opened in a vertical direction in a width enough for preventing the insertion member 8 from being attached or detached in the horizontal direction. The receiving member 9 is fixed to the lower side of the structural body 7 as shown in FIG. 10.

That is, the tightening member 13 attached from the side of the post 2 is engaged with the male threads 9f of the receiving member 9, and by the tightening force of the tightening member 13 abutting against the lower end of the insertion member 8 protruding beneath the male threads 9f of the receiving member 9, the insertion member 8 is lifted up in a direction to be fitted to the receiving member 9, and the receiving member 9 is pulled down by this reaction, and the taper faces of the insertion member 8 and receiving member 9 are pressed to each other. As a result, a larger gripping force is obtained than in the structure shown in FIG. 11 and FIG. 12, and the post 2 and structural body 7 can be firmly fixed in tight state.

If the insertion member 8 and receiving member 9 are fitted and fixed in mutually matched state by the tightening force of the tightening members 12, 13, the post 2 above the mounting position of the insertion member 8 may be inserted into the receiving hole 9a of the receiving member 9 attached to the edge of the structural body 7 from the horizontal direction by way of notches 9b, 12b, 13b.

The notches 12b, 13b of tightening members 12, 13 are matched with the notch 9b of the receiving member 9 so that the post 2 may be allowed to be attached or detached in the horizontal direction. By using the tightening members 12 and 13 together, the insertion member 8 and receiving member 9 may be mutually fitted and fixed.

Figure 15:
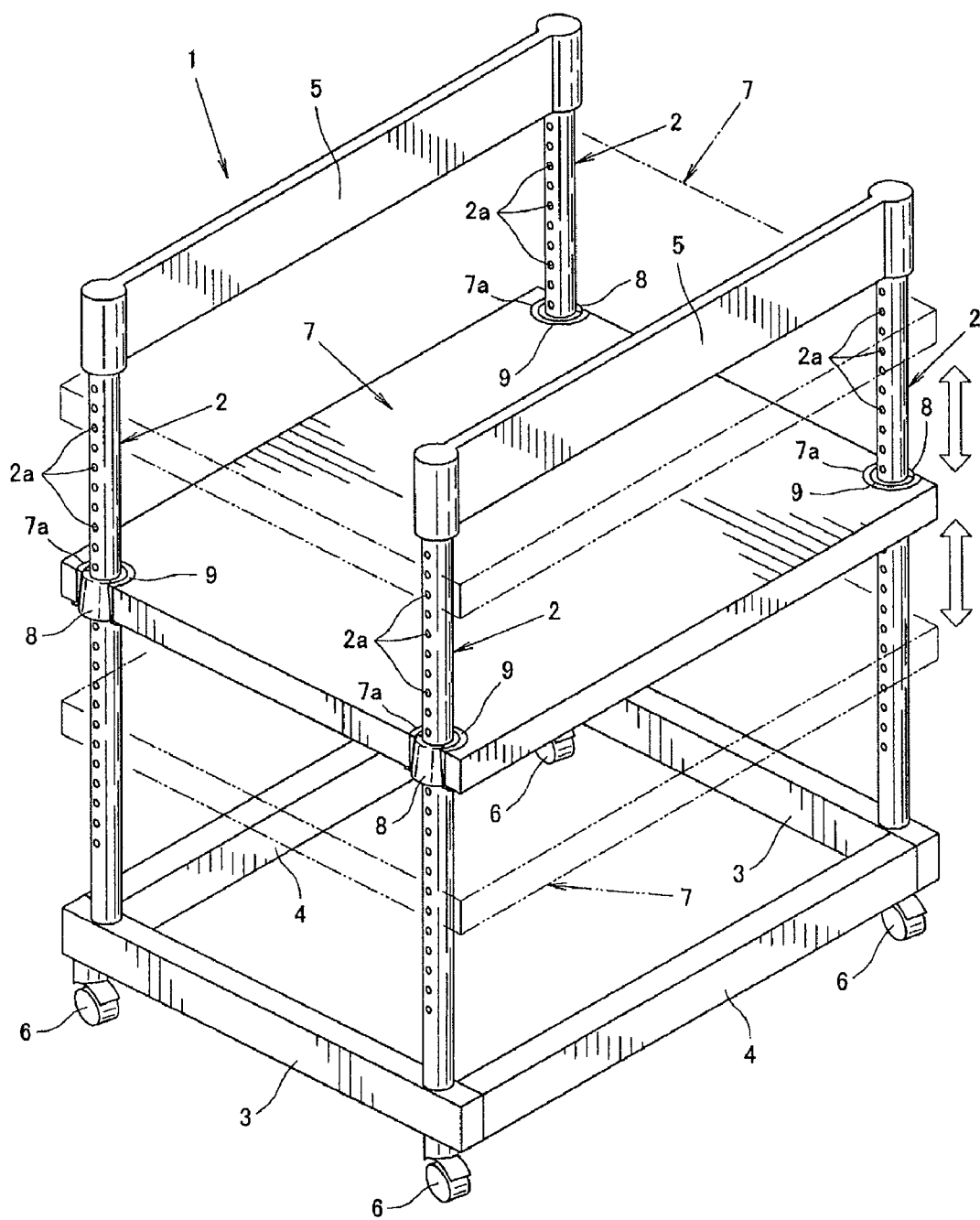
FIG. 15 is a perspective view of structure of mounting a structural body mounted on four posts.

FIG. 15 shows a structure 1 mounted on four posts 2 . . . set up at four corners composing the structure 1, in which insertion members 8 . . . attached to the posts 2 . . . and receiving members 9 . . . installed at four corners of structural body 7 are mutually fitted and fixed similarly, and the same action and effect as in embodiment 1 are obtained. Besides, as indicated by virtual line in the drawing, a plurality of structural bodies 7 may be provided.

Figure 16:
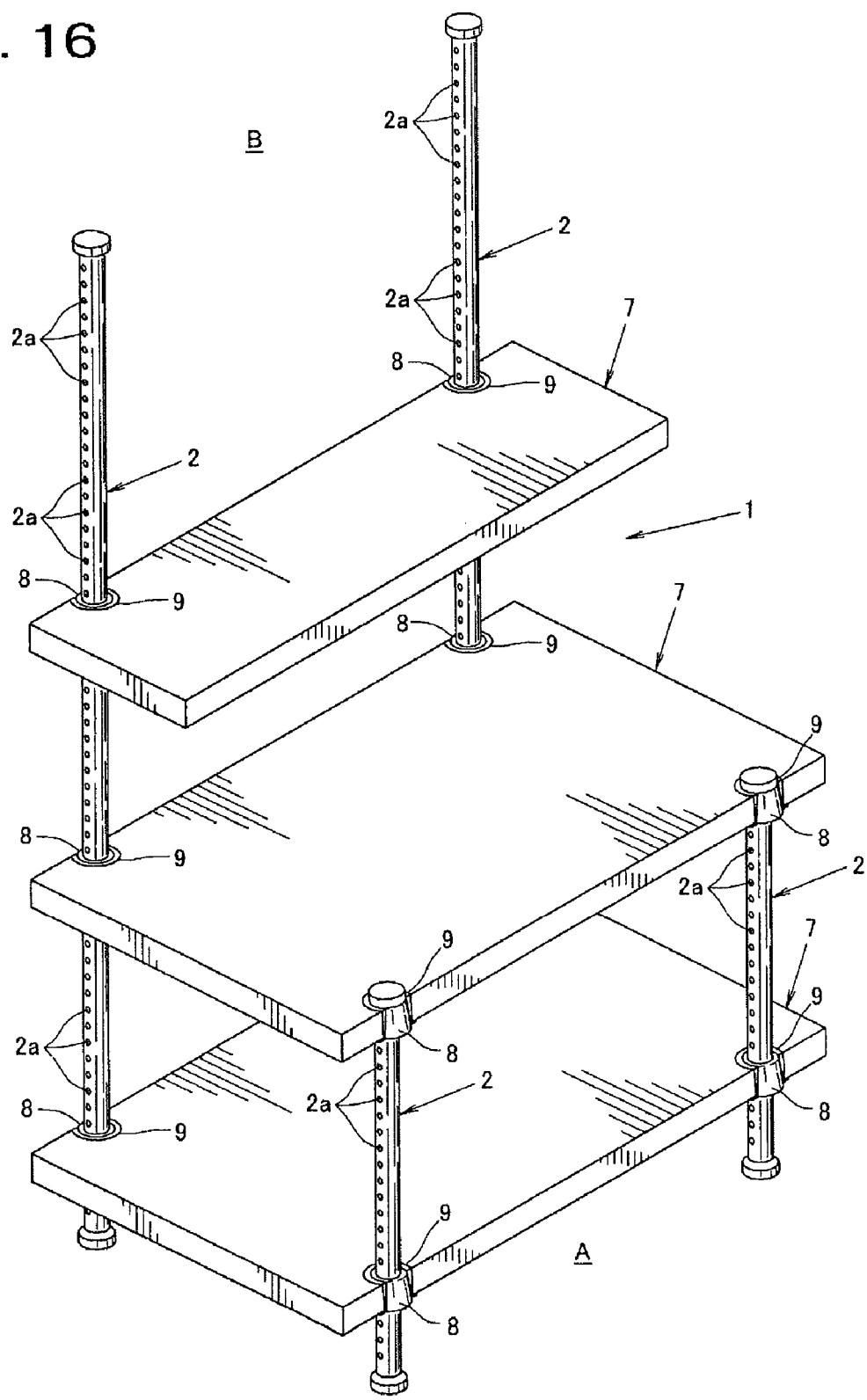
FIG. 16 is a perspective view of structure of mounting a shelf-like structural body.

FIG. 16 shows a structure 1 having a shelf-like structural body 7, in which the shelf-like structural body 7 is mounted from the front side in order to enhance the quake resistance, by way of the insertion member 8 and receiving member 9, on the posts 2, 2 fixed in stretched state between floor A and ceiling B or on the posts 2, 2 set up at the front side, and therefore the structural body 7 can be attached and detached easily and simply, and the working efficiency is enhanced.

Figure 17:
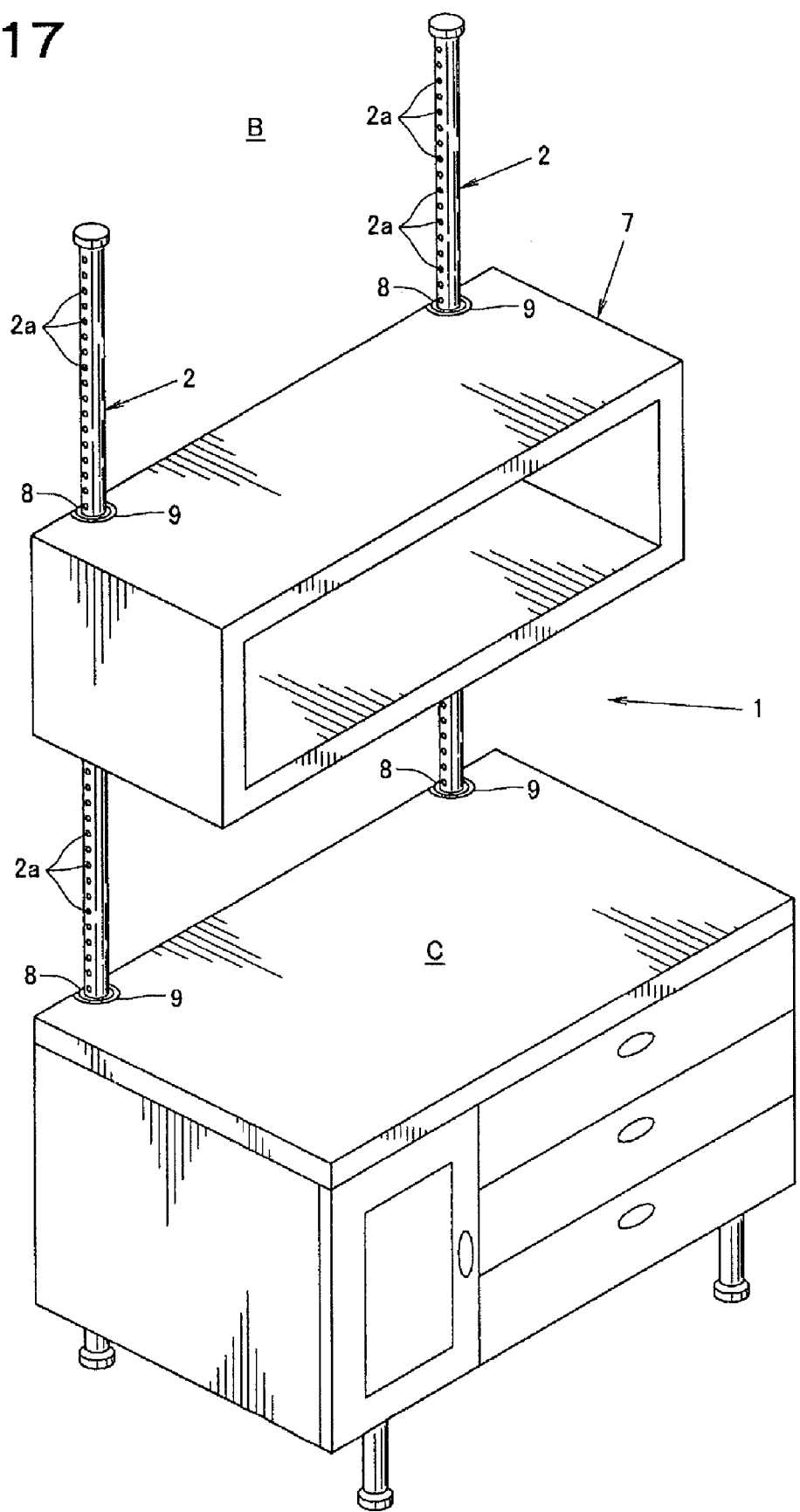
FIG. 17 is a perspective view showing an assembly example of structure of mounting a box-like structural body.

FIG. 17 shows an assembly example of structure 1 having a box-like structural body 7, in which the box-like structural body 7 is mounted in a singularity or a plurality from the front side, by way of the insertion member 8 and receiving member 9, on the posts 2, 2 set up between furniture C and ceiling B, and therefore the structural body 7 can be attached and detached easily and simply, and the wall or space above the furniture C can be utilized effectively. Or a shelf-like structural body 7 may be mounted in a singularity or a plurality.

Figure 18:
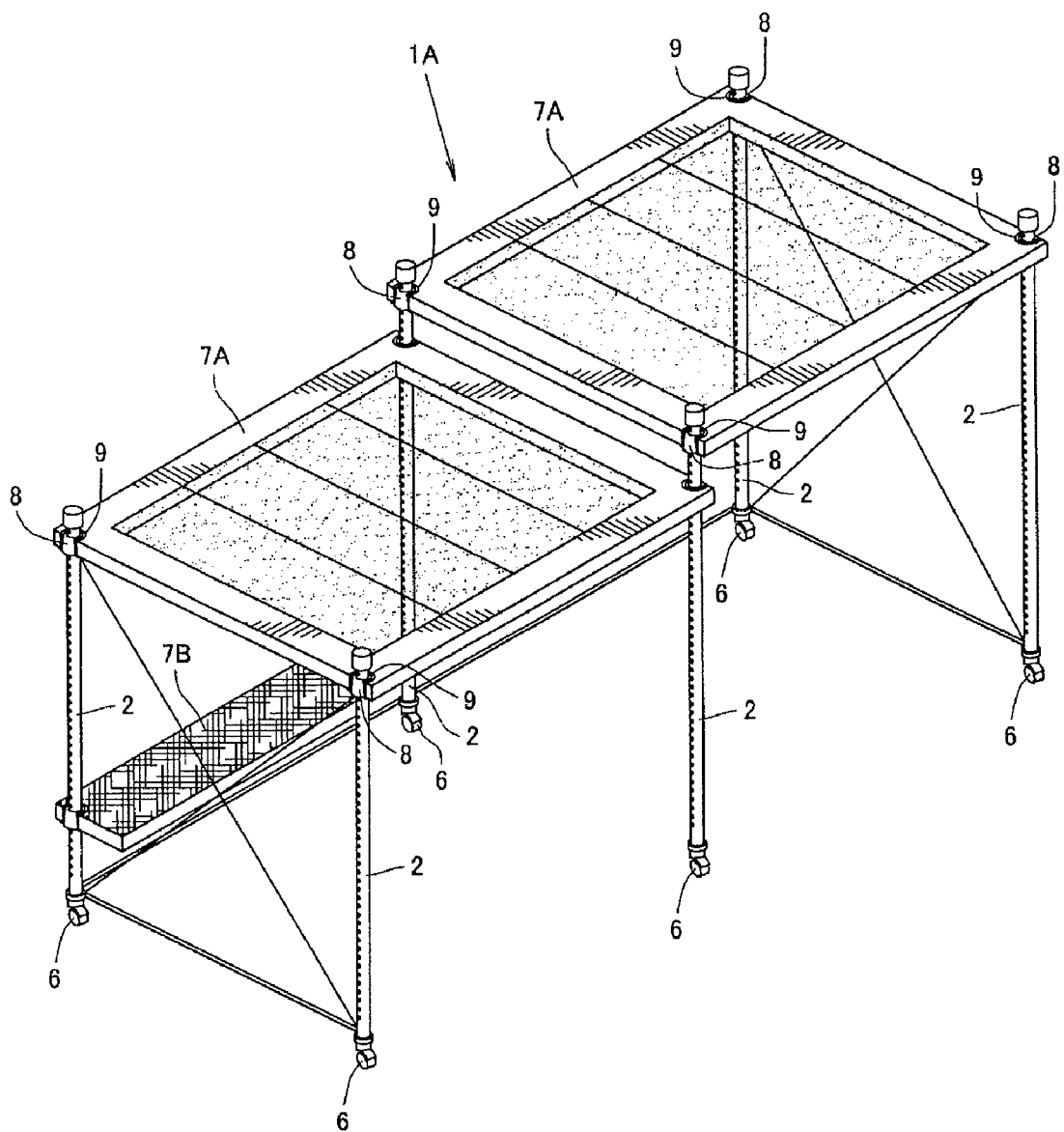
FIG. 18 is a perspective view showing an assembly example of structure of outdoor installation type.

FIG. 18 shows an assembly example of structure 1A of outdoor installation type, in which frame-like structural bodies 7A, 7A mounting sun and rain shelter members are mounted, by way of the insertion member 8 and receiving member 9, on the upper ends of posts 2, . . . set up at specified interval, and therefore the structure can be assembled easily and simply at the site of installation without using any tool. Besides, a chair-like structural body 7B may be provided between the posts 2, 2.

Figure 19:
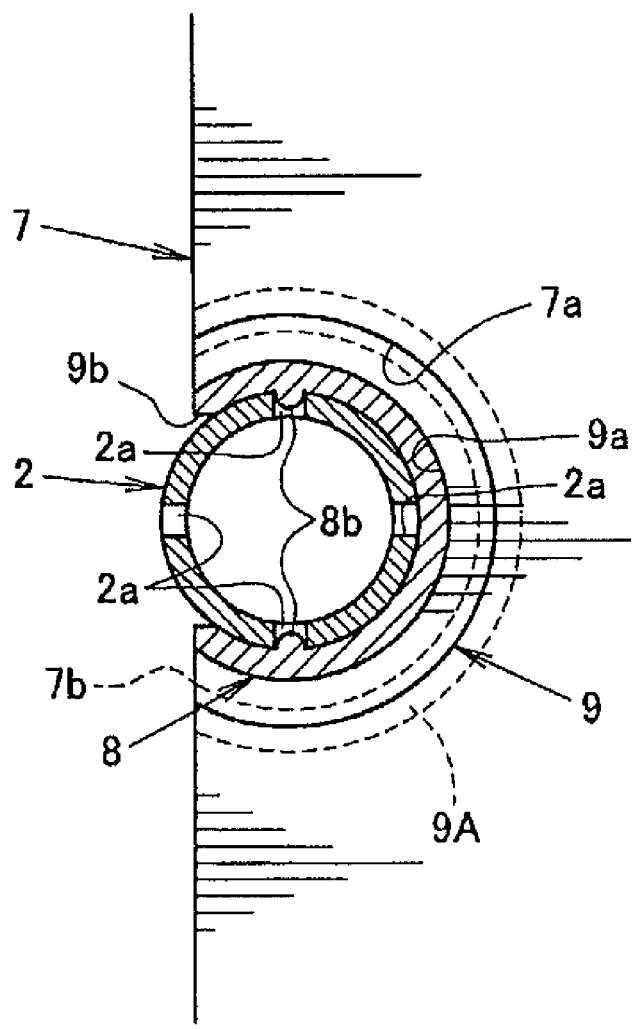
FIG. 19 is a plan view of structure of using C-shaped insertion member.

FIG. 19 shows an assembly structure forming the insertion member 8 formed in a C-shape as seen from a plane opened at one side edge, in which both ends of the opening side of the insertion member 8 are extended in a radial direction so as to be wider than the outside diameter of the post 2 by resisting the material elasticity, and the insertion member 8 is fitted against the outer circumference of the post 2 from the horizontal direction.

Protrusions 8b, 8b projecting to the inner circumference of the opening side of the insertion member 8 are stopped in holes 2a, 2a formed in the outer circumference at both sides of the post 2, the both ends at the opening side of the insertion member 8 are restored to an internal narrower than the outside diameter of the post 2, and the insertion member 8 is held in a state fitted to the outer circumference of the post 2.

Later, the insertion member 8 attached to the post 2 is inserted into the receiving hole 9a of the receiving member 9 attached to the structural body 7 from beneath, and the insertion member 8 and receiving member 9 are mutually fitted and fixed, and the same action and effect as in embodiment 1 are obtained.

Moreover, since the receiving member 9 is fitted to the outer circumference of the insertion member 8, the both ends at the opening side of the insertion member 8 are prevented from being extended in the radial direction, and the stopped state of the holes 2a, 2a of the post 2 and the protrusions 8b, 8b of the insertion member 8 may be maintained.

The insertion member 8 attached to the post 2 is drawn out from the receiving hole 9a of the receiving member 9 attached to the structural body 7, and the both ends of the opening side of the insertion member 8 are extended to an interval wider than the outside diameter of the post 2 and the insertion member 8 is detached from the outer circumference of the post 2, so that the mounting position of the insertion member 8 can be changed.

Holes 2a, 2a are formed at positions eccentric about 90 degrees in the circumferential direction from the axial center of post 2, and are disposed in a plurality at specific equal interval in the length direction along the outer circumference of the post 2.

When either one of the post 2 and insertion member 8 is rotated in horizontal direction, the protrusions 8b, 8b of insertion member 8 are stopped in the holes 2a, 2a arranged on the same circumference of the post 2, and the insertion member 8 can be fitted in a state directed to a desired direction to the post 2.

Figure 20:
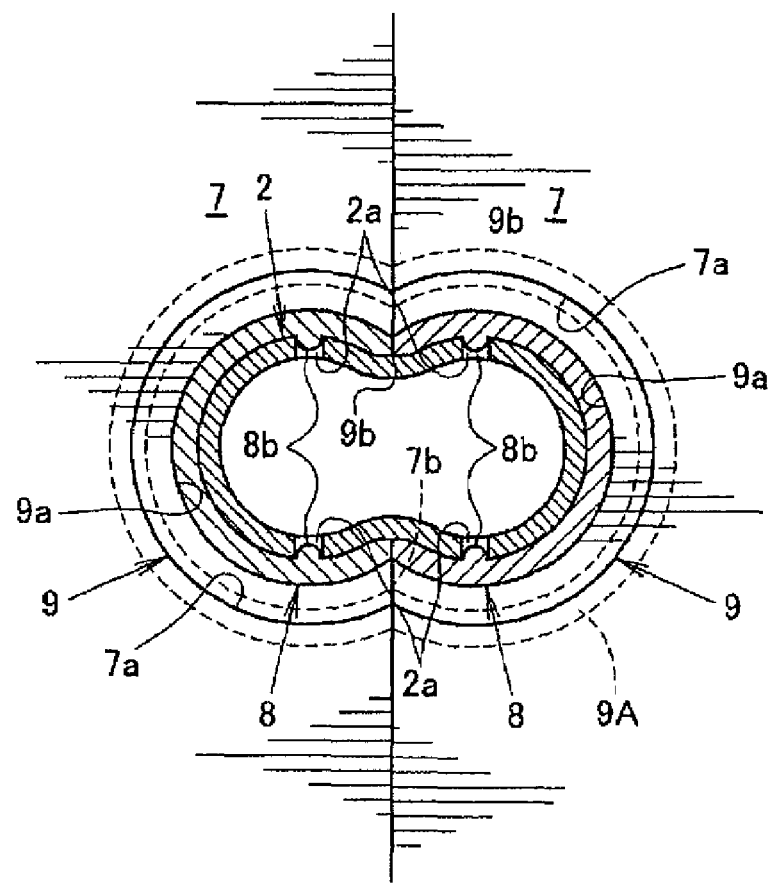
FIG. 20 is a plan view of coupling structure of structural body using the insertion member in FIG. 19.

FIG. 20 shows an assembly structure of insertion member 8 coupled and fixed in mutually abutting state of structural bodies 7, 7 such as shelves and panels, in which the insertion members 8, 8 are installed respectively on the right outer circumference and left outer circumference on the same circumference of the post 2 formed in elliptical section as seen from the plane. Protrusions 8b, 8b projecting to the inner circumference of the opening side of the insertion members 8, 8 are stopped in holes 2a, 2a formed at the right and left outer circumferences of the post 2.

Later, the insertion member 8 attached to the right outer circumference of the post 2 is fitted to the receiving member 9 provided in the right structural body 7 from beneath, and the insertion member 8 attached to the left outer circumference of the post 2 is inserted into the receiving member 9 provided in the left structural body 7 from beneath, and the right and left structural bodies 7, 7 are coupled and fixed in mutually abutting state, and the upper sides of the right and left structural bodies 7, 7 are fixed horizontally or at same height.

Figure 21:
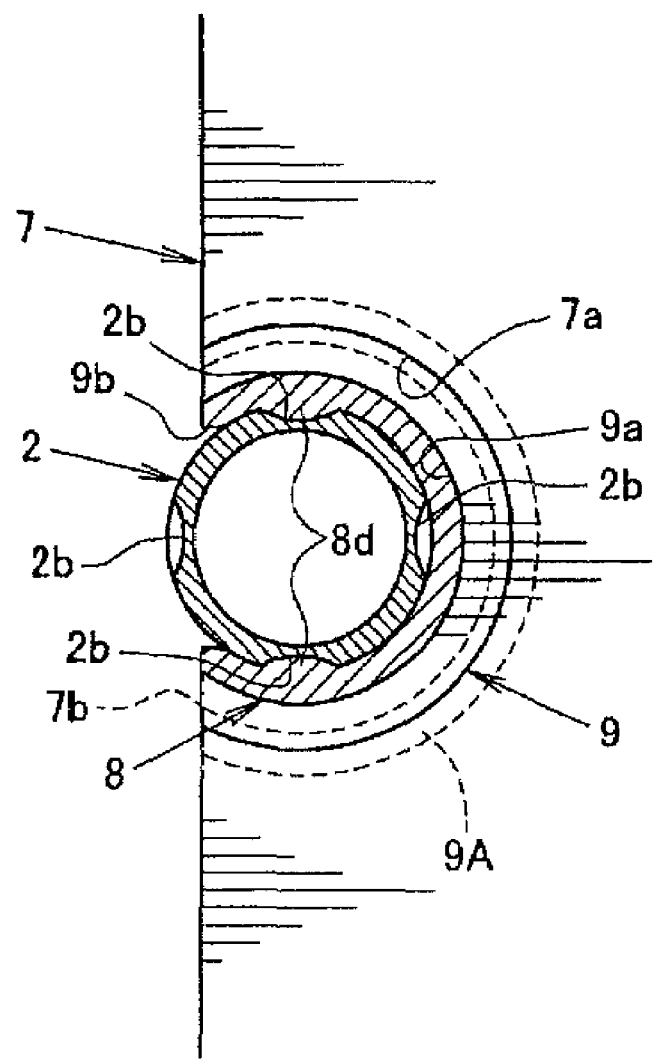
FIG. 21 is a plan view showing a structure of fitting insertion member and post in FIG. 19.

FIG. 21 shows an assembly structure, in which protrusions 8d, 8d of arc section as seen from the plane projecting long the inner circumference of the opening side of the insertion member 8 are stopped respectively in grooves 2b, 2b of arc section as seen from the plane formed along both outer circumferences of the post 2, and the groove 2b is formed in a curvature shape to be deepest in the center, and gradually shallower toward the circumferential direction from the center.

The protrusion 8d is formed in size and shape conforming to the groove 2b, and is formed in a curvature shape to be smallest in diameter in the center, and gradually larger in diameter toward the circumferential direction from the center.

That is, the insertion member 8 is extended in the radial direction, and is fitted to the outer circumference of the post 2 from the horizontal direction, and the protrusions 8d, 8d projecting to the inner circumference of the opening side of the insertion member 8 are stopped in the grooves 2b, 2b formed in the outer circumference of both sides of the post 2, and therefore by rotating either the post 2 or the insertion member 8 about 90 degrees in the horizontal direction, the protrusions 8d, 8d of the insertion member 8 are stopped in the grooves 2b, 2b at positions about 90 degrees eccentric from the axial center of the post 2, and the insertion member 8 can be fitted in a state directed to an arbitrary direction to the post 2, and the same action and effect as in embodiment 1 are obtained.

The insertion member 8 shown in FIG. 19 to FIG. 21 may be formed in a shape corresponding to the post outside having, for example, square, rectangular, pentagonal or hexagonal section.

When fitting to the outside of the post 2 having square section, the both ends of the opening side of the insertion member 8 formed in a U-shape as seen from the plane are extended to an interval wider than the width of the post 2, and the insertion member 8 is fitted to cover the rear side and both lateral sides of the post 2, and the both ends at the opening side of the insertion member 8 are stopped at both corners of the front side of the post 2.

EMBODIMENT 2

Figure 22:
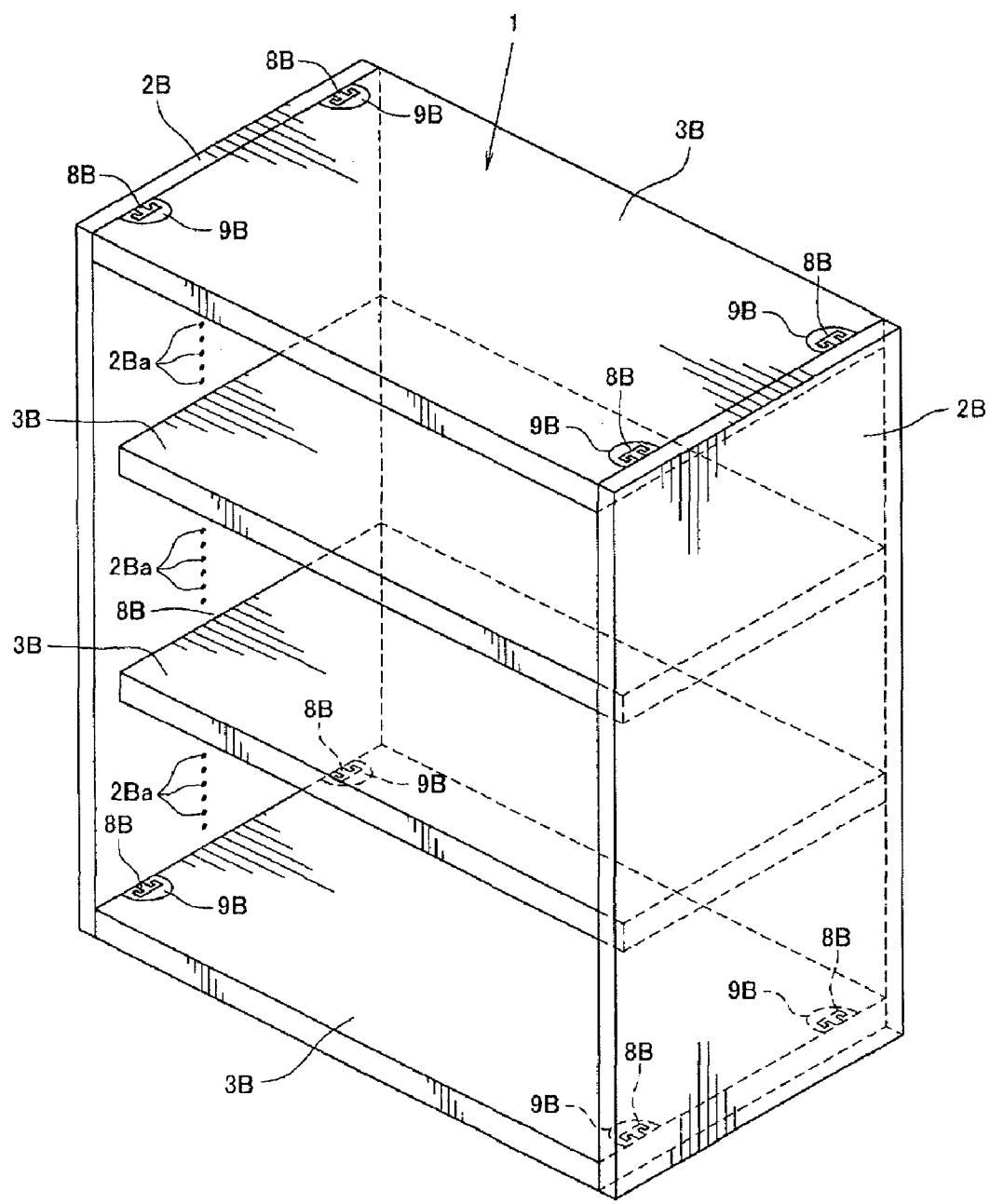
FIG. 22 is a perspective view of assembly example of structural body by assembly structure in a second embodiment.

FIG. 22 shows an assembly structure of second embodiment, in which insertion members 8B . . . fitted to a pair of right and left panels 2B, 2B for composing the structure 1 are inserted and fixed in receiving members 9B . . . provided at both edges of shelves 3B . . . for composing, for example, shelf plate, bottom plate or top plate, so as to be assembled without using any tool. In the embodiment, the insertion member 8B and receiving member 9B are made of same material, but may be also made of different materials.

The structure 1 is composed of two flat panels 2B, 2B which are set up vertically in the immediately upward direction across lateral gap corresponding to the overall length of the shelf 3B, in which insertion members 8B . . . attached to the upper end opposite faces and lower end opposite faces of panels 2B, 2B are fitted and fixed to the receiving members 9B fitted to both edges of the bottom plate shelf 3B and top plate shelf 3B from beneath. Both edges of moving shelves 3B . . . set up between the bottom plate shelf 3B and top plate shelf 3B are mounted on shelf receiving members 20 . . . attached to the central opposite faces of panels 2B, 2B, and the bottom plate, top plate, and moving shelves 3B are set up horizontally.

Figure 23:
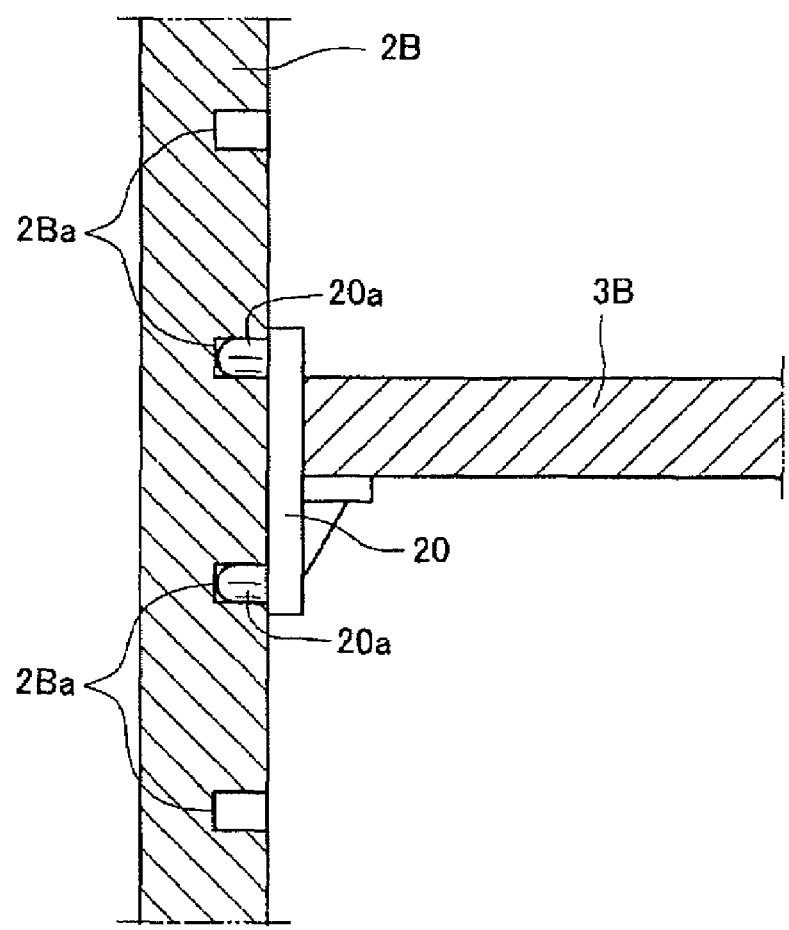
FIG. 23 is a sectional view showing a mounting state of shelf receiving member.

The shelf receiving member 20, as shown in FIG. 23, two protrusions 20a, 20a set up at the back side of the members are inserted, fixed and positioned in hole 2Ba . . . at desired positions spaced and arrayed at specific equal interval opposite to the vertical direction along the vertical plane of the panel 2B, and only by changing the insertion position of the shelf receiving members 20 . . . , the moving shelves 3B . . . can be moved vertically to a desired height.

In the embodiment, the insertion member 8B is fixed to the upper end vertical plane and lower end vertical plane of panel 2B by two screws 23, 23, or it may be also fixed by other fixing means, such as bolt, nail or adhesive. Same as in the shelf receiving member 20, the protrusions formed at the back side of the insertion member 8B may be inserted and fixed in the holes 2Ba . . . of the panel 2B.

Figure 24:
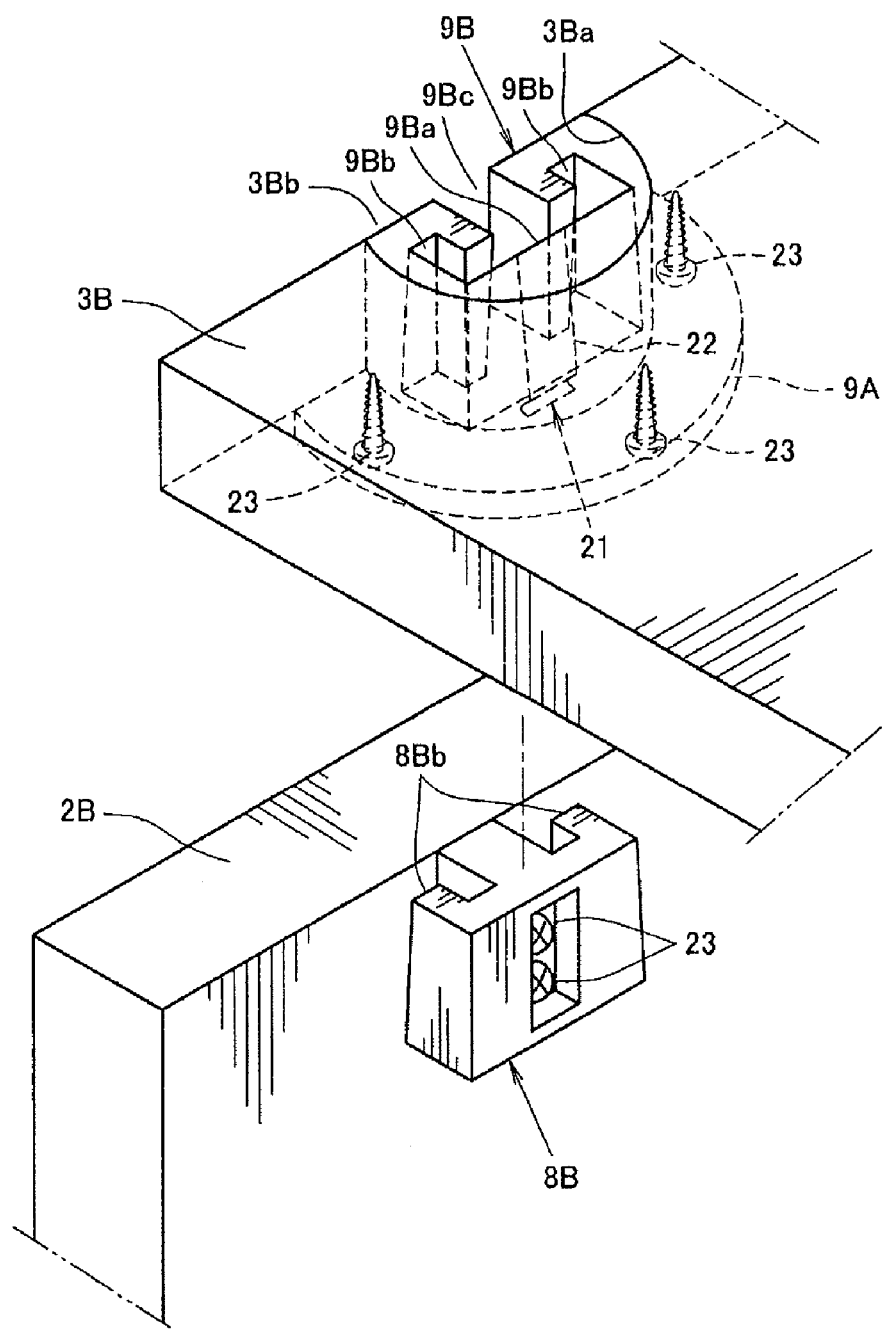
FIG. 24 is a perspective view showing a mounting method of insertion member and receiving member.
Figure 25:
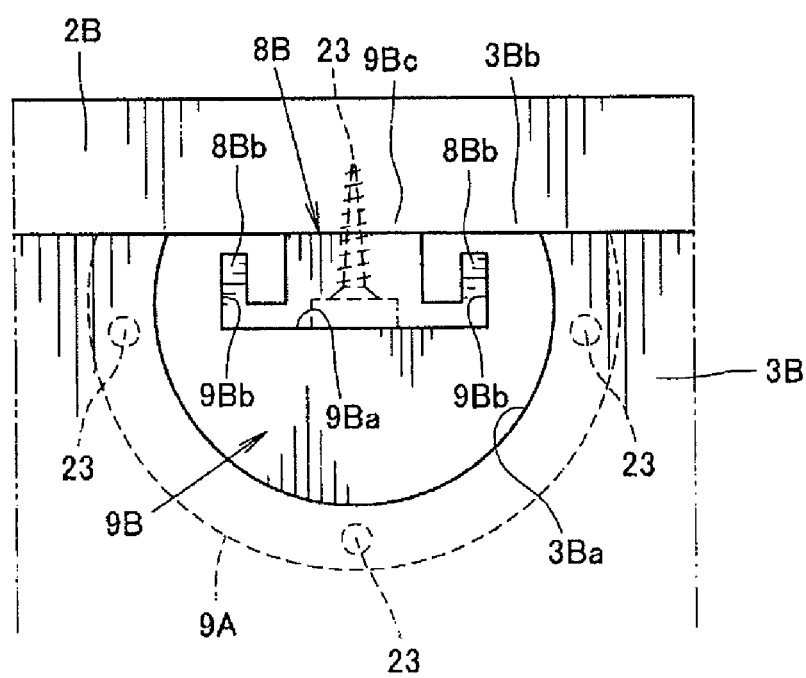
FIG. 25 is a plan view showing a mounting method of insertion member and receiving member.

The insertion member 8B as shown in FIG. 24 and FIG. 25 is formed in size and shape conforming to the receiving hole 9Ba of receiving member 9B described below, and is formed in a taper profile to be gradually reduced in size or thickness from the lower end to the upper end corresponding to the inside of the receiving hole 9Ba. It is also formed in a shape allowed to be inserted in the receiving hole 9Ba from beneath, and prevented from being attached or detached in the horizontal direction (or lateral direction).

A pair of stopping parts 8Bb, 8Bb formed on the both outer sides of the insertion member 8B are formed in size and shape allowed to be inserted into a pair of stopping grooves 9Bb, 9Bb formed in the receiving member 9B, and preventing the insertion member 8B from being separated in the horizontal direction. The stopping parts 8Bb, 8Bb are formed in a taper profile gradually reduced in size or thickness from the lower end to the upper end.

The receiving member 9B is formed in size and shape conforming to the support hole 3Ba of C shape (or semicircular shape) as seen from the plane formed at one edge of the shelf 3B, and is formed in size allowed to be inserted in the support hole 3Ba from beneath and prevented from being attached or detached in the horizontal direction.

A notch 3Bb opened at the edge near the support hole 3Ba allows the post 2 to be attached or detached in the horizontal direction, and a notch is formed in the vertical direction by communicating with the support hole 3Ba in a width for preventing the receiving member 9B from being attached or detached in the horizontal direction.

The inside of the receiving hole 9Ba formed in the receiving member 9B is formed in a taper profile to be gradually narrowed in width from the lower end side to the upper end side by corresponding to the outside of the insertion member 8B. The insertion member 8B is allowed to be inserted from beneath, and the insertion member 8B is formed in a shape prevented from being separated in the horizontal direction.

A pair of stopping grooves 9Bb, 9Bb formed in both inner sides of the receiving hole 9Ba are formed in size and shape so that a pair of stopping parts 8Bb, 8Bb formed in the insertion member 8B are allowed to be inserted from beneath, and that the insertion member 8B is prevented from separating in the horizontal direction. The stopping grooves 9Bb, 9Bb are formed in a taper profile so as to be gradually reduced in width from the lower end to the upper end corresponding to the stopping parts 8Bb, 8Bb.

A notch 9Bc opened in one side edge of the receiving member 9B corresponding to the notch 3Bb of the shelf 3B is cut in the vertical direction by communicating with the receiving hole 9Ba in a width so that the insertion member 8B may be allowed to be inserted in the vertical direction and that the insertion member 8B may be prevented from being attached or detached in the horizontal direction.

An extraction preventive mechanism 21 provided in the receiving hole 9Ba prevents extraction by stopping the lower end of plate spring 22 fixed in the center of the receiving hole 9Ba in the lower side edge of the insertion member 8B inserted in the receiving hole 9Ba. When the lower end of the plate spring 22 is detached from the lower side edge of the insertion member 8B by resisting the restoring force of the spring, stopping is cleared, and the insertion member 8B and the receiving member 9B are allowed to be separated from each other.

A brim-like flange 9A formed continuously in the circumferential direction along the lower outer side of the receiving member 9B is fixed in the lower peripheral edge of the support hole 3Ba formed in the shelf 3B by means of a plurality of screws 23 . . . When inserting the insertion member 8B in the receiving hole 9Ba of the receiving member 9B, or inserting the post 2 into the receiving hole 9Ba of the receiving member 9B, the receiving member 9B is prevented from dropping out of the support hole 3Ba of the shelf 3B. The flange 9A may be also formed partially across a specified interval in the circumferential direction along the lower outer circumference of the receiving member 9B.

The embodiment has such configuration, and an assembling method of structure 1 of the assembly structure of the second embodiment is described below.

First, as shown in FIG. 24 and FIG. 25, a pair of insertion members 8B, 8B are fixed in the upper side opposite edges and lower side opposite edges of panels 2B, 2B composing the structure 1, receiving members 9B . . . are inserted into support holes 3Ba . . . formed in bottom plate shelf 3B and top plate shelf 3B from beneath, the notch 3Bb of support hole 3Ba formed in the shelf 3B and the notch 9Bc of receiving hole 9Ba formed in the receiving member 9B are matched, and the upper end of shelf 3B and upper end of receiving member 9B are fixed to be horizontal or nearly at same height.

Two panels 2B, 2B are set up vertically to the immediately upward direction across a lateral gap corresponding to the overall length of the shelf 3B, the insertion members 8B . . .

attached to upper and lower edges of the panels 2B, 2B are inserted into receiving members 9B . . . attached to the bottom plate shelf 3B and top plate shelf 3B from beneath, and the upper end of insertion members 8B . . . and upper end of receiving members 9B . . . are fixed to be horizontal or nearly at same height.

A pair of stopping parts 8Bb, 8Bb formed in the insertion member 8B are inserted into a pair of stopping grooves 9Bb, 9Bb formed in the receiving hole 9Ba from beneath and stopped, and the insertion member 8B and receiving member 9B are matched and fixed in a state to be prevented from being separated in the horizontal direction. Further, the moving shelf 3B . . . is mounted horizontally, as shown in FIG. 23, on a pair of right and left shelf receiving members 20 . . . attached to opposite sides in the center of panels 2B, 2B, so that the structure 1 shown in FIG. 22 is assembled completely.

On the other hand, when the panel 2B is pulled down and the shelf 3B is lifted up, and the insertion member 8B is drawn out from the receiving hole 9Ba of the receiving member 9B, the panel 2B of the insertion member 8B side and the shelf 3B of the receiving member 9B side can be separated from each other.

Thus, the insertion member 8B attached to one panel 2B is fitted to the receiving hole 9Ba of the receiving member 9B attached to other shelf 3B from beneath, and a pair of stopping parts 8Bb, 8Bb of L shape in a plan view formed in the insertion member 8B are engaged with a pair of stopping grooves 9Bb, 9Bb of L shape in a plan view formed in the receiving member 9, and the structure is very complicated. That is, the number of pressing sides is great between the stopping parts 8Bb, 8Bb and stopping grooves 9Bb, 9Bb, and they are pressed in a plurality of directions including longitudinal direction and lateral direction, and the separation blocking force is strong in the horizontal direction, and a sufficient engaging force is obtained for preventing separation of panel 2B and shelf 3B.

Moreover, by the natural load applied to the shelf 3B or the weight of the structural body, the outer side of the stopping parts 8Bb, 8Bb and the inside taper faces of the stopping grooves 9Bb, 9Bb are mutually pressed, and the contact resistance occurring on the pressing sides of the stopping parts 8Bb, 8Bb and stopping grooves 9Bb, 9Bb is increased, and the panel 2B and shelf 3B can be fixed firmly and securely.

If there is a slight error in assembling precision of insertion member 8B and receiving member 9B, by mutually fitting the tape faces of the insertion member 8B and receiving member 9B, they can be fixed firmly in tight state. Since the precision error can be absorbed or corrected, members of different materials can be combined appropriately.

Figure 26:
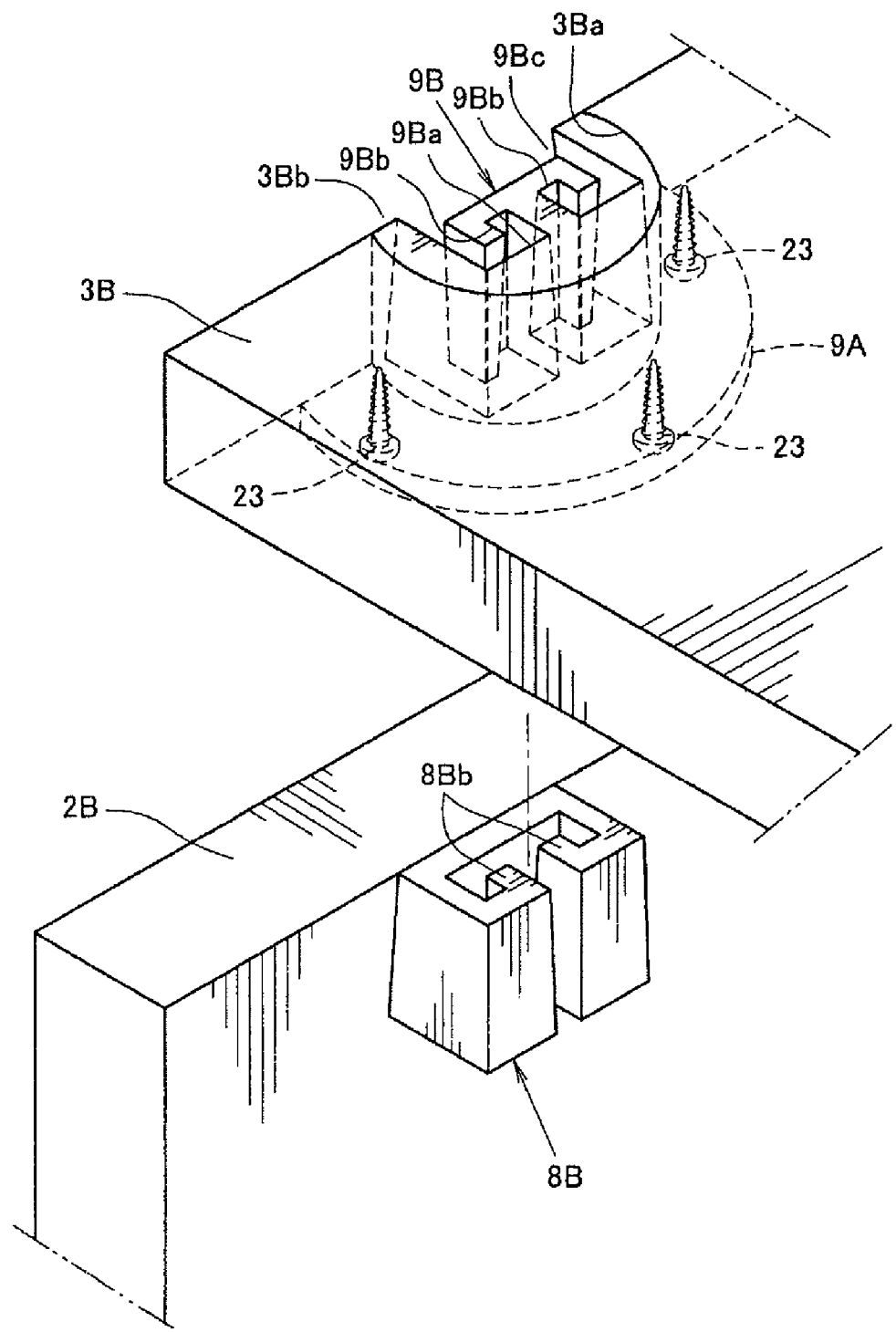
FIG. 26 is a perspective view of structure for fixing panel and shelf.

FIG. 26 shows other example of assembly structure for fixing the panel 2B and shelf 3B, in which the insertion member 8B attached to the panel 2B is inserted into the receiving hole 9Ba of the receiving member 9B attached to the shelf 3B from beneath, and a pair of stopping parts 8Bb, 8Bb formed by folding the both ends of the insertion member 8B to the inside are stopped in a pair of stopping grooves 9Bb, 9Bb of the receiving hole 9Ba formed in size and shape conforming to the insertion member 8B, and the same action and effect as in embodiment 2 are obtained.

Figure 27:
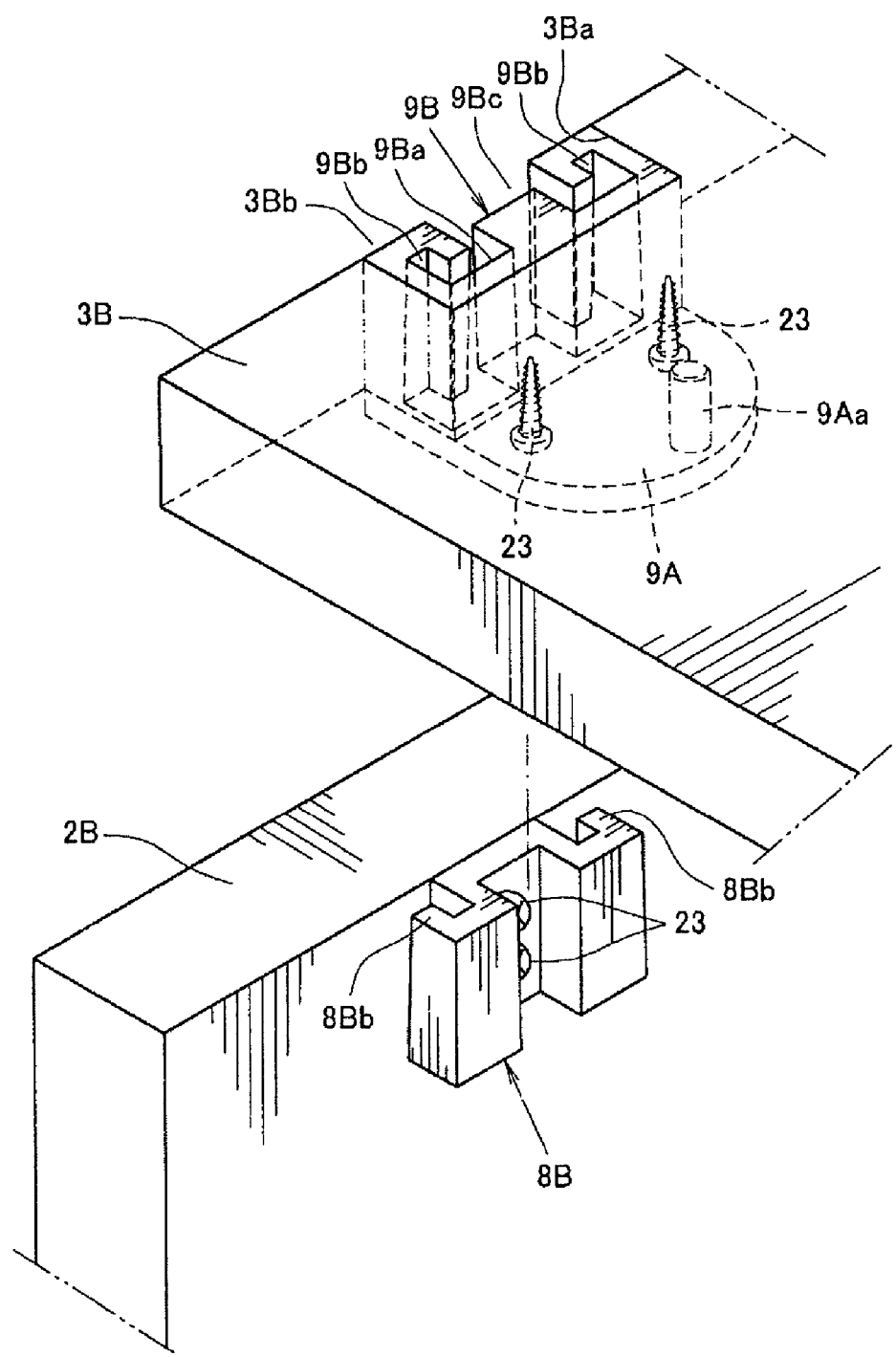
FIG. 27 is a perspective view of other structure for fixing panel and shelf.
Figure 28:
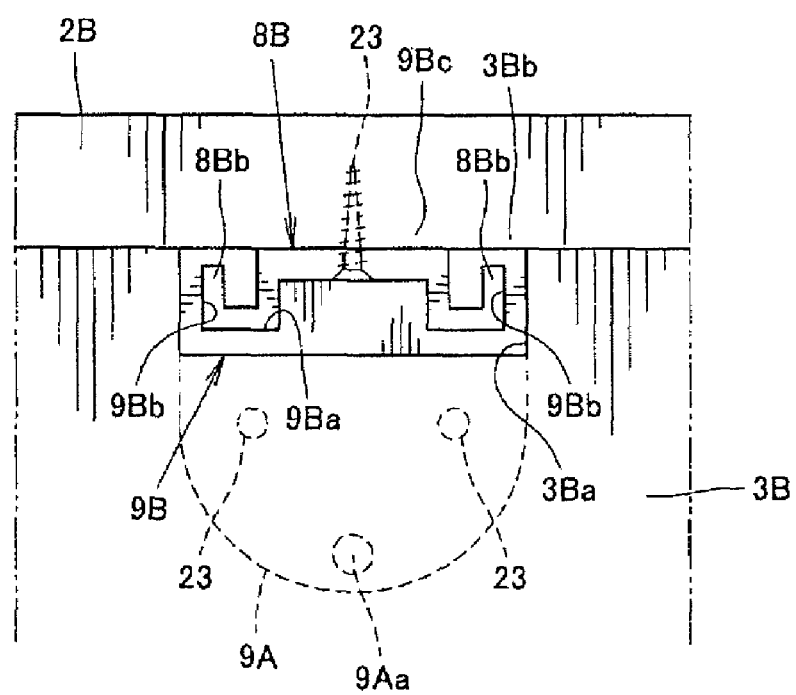
FIG. 28 is a plan view of mounting state of insertion member and receiving member in FIG. 27.

FIG. 27 and FIG. 28 show an assembly structure for fixing the panel 2B and shelf 3B, in which the insertion member 8B formed in a recess in the center is fixed to the vertical plane of the panel 2B by screws 23 . . . , and the receiving member 9B formed in a rectangular section in a plan view is inserted into the support hole 3Ba of the shelf 3B of rectangular shape formed in size and shape conforming to the receiving member 9B from beneath.

The flange 9A formed outside of lower end rear part of the receiving member 9B is stopped or engaged with the lower side of the shelf 3B mounted on the flange 9A by fixing with screws 23 . . . , and protrusions 9Aa such as dowel or pin projecting from the flange 9A are inserted and fixed in holes or recesses formed in the lower side of the shelf 3B, and the shelf 3B mounted on the flange 9A can be supported horizontally.

Next, the insertion member 8B attached to the panel 2B is inserted into the receiving hole 9Ba of the receiving member 9B attached to the shelf 3B from beneath, and a pair of stopping parts 8Bb, 8Bb formed in the insertion member 8B are stopped in a pair of stopping grooves 9Bb, 9Bb formed in the receiving member 9B, and the same action and effect as in embodiment 2 are obtained. The receiving member 9B may be also used as a structure for fixing the post 2 shown in FIG. 33.

Figure 29:
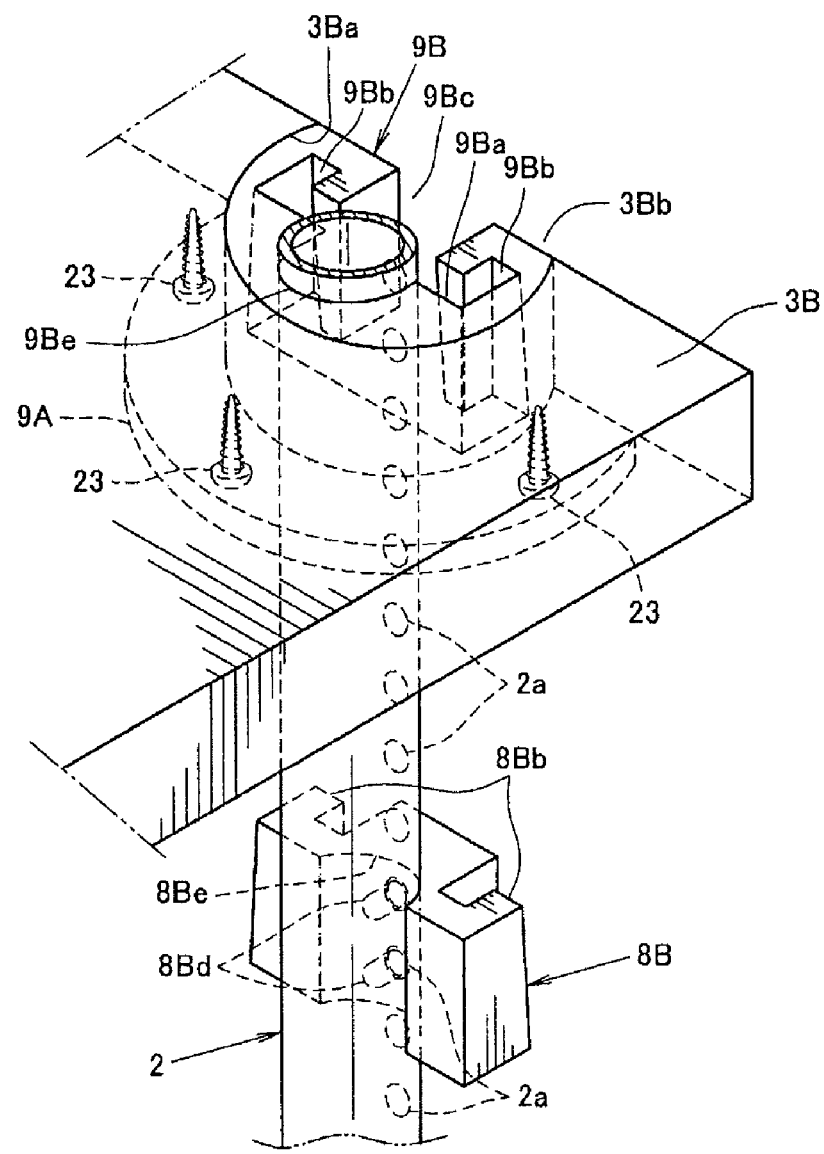
FIG. 29 is a perspective view of structure for fixing shelf and post.
Figure 30:
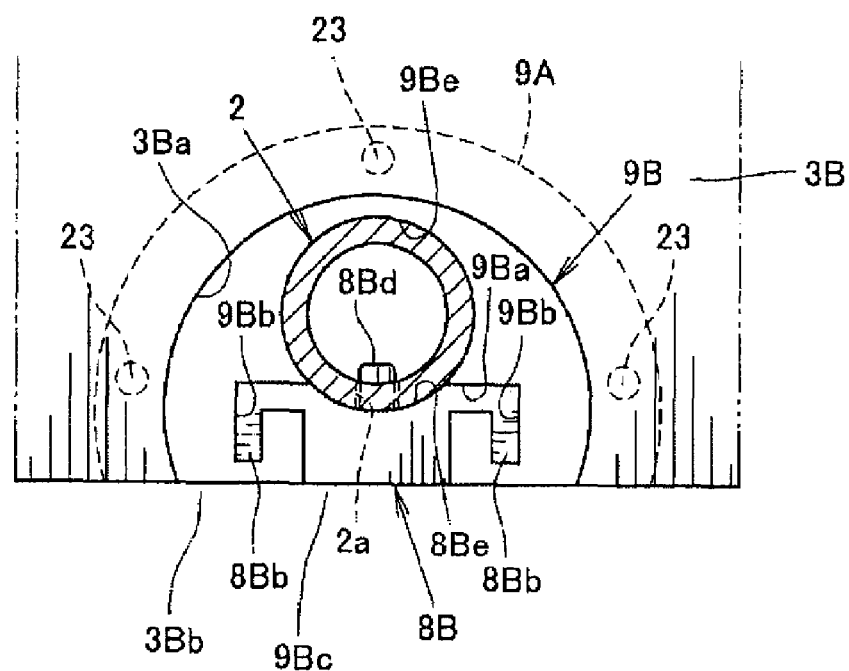
FIG. 30 is a plan view of assembled state of insertion member and receiving member in FIG. 29.

FIG. 29 and FIG. 30 show an assembly structure for fixing the shelf 3B and post 2, in which two protrusions 8Bd, 8Bd projecting from the receiving side 8Be of the insertion member 8B are inserted and fixed in the holes 2a . . . formed at specific equal interval in the length direction against the outer circumference of the post 2, and the insertion member 8B is mounted at a desired height position above the post 2.

The post 2 projecting above the insertion member 8B is inserted into the receiving hole 9Ba of the receiving member 9B attached to the shelf 3B from the horizontal direction, and the post 2 is held on the receiving side 9Be formed in the receiving member 9B, and the insertion member 8B attached to the post 2 is inserted into the receiving hole 9Ba of the receiving member 9B attached to the shelf 3B from beneath, and a pair of stopping parts 8Bb, 8Bb formed in the insertion member 8B are stopped in a pair of stopping grooves 9Bb, 9Bb formed in the receiving member 9B, and the same action and effect as in embodiment 2 are obtained.

The notch 9Bc of the receiving member 9B is opened in a vertical direction by communicating with the receiving hole 9Ba in a width allowing the post 2 to be attached and detached in a horizontal direction (or sideways), and preventing the insertion member 8B from being attached or detached in a horizontal direction (or sideways). The insertion member 8B may be fixed to the post 2 by screws or the like. The upper end of the post 2 having adjusting function is closed by a cap, and the lower end of the post 2 is closed by a grounding member.

Figure 31:
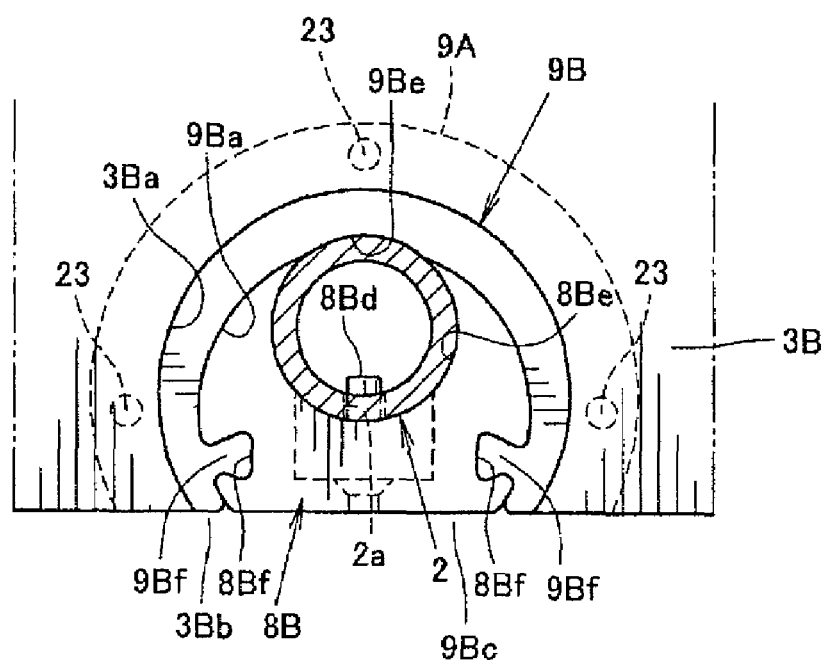
FIG. 31 is a plan view of other structure for fixing shelf and post.

FIG. 31 shows other assembly structure for fixing the shelf 3B and post 2, in which two protrusions 8Bd, 8Bd projecting from the receiving side 8Be of the insertion member 8B are inserted and fixed in the holes 2a . . . of the post 2, and the insertion member 8B attached to the post 2 is inserted into the receiving hole 9Ba of the receiving member 9B attached to the shelf 3B from beneath, and a pair of stopping grooves 8Bf, 8Bf formed in the insertion member 8 are engaged with a pair of stopping parts 9Bf, 9Bf formed in the receiving member 9B, and the same action and effect as in embodiment 2 are obtained.

Figure 32:
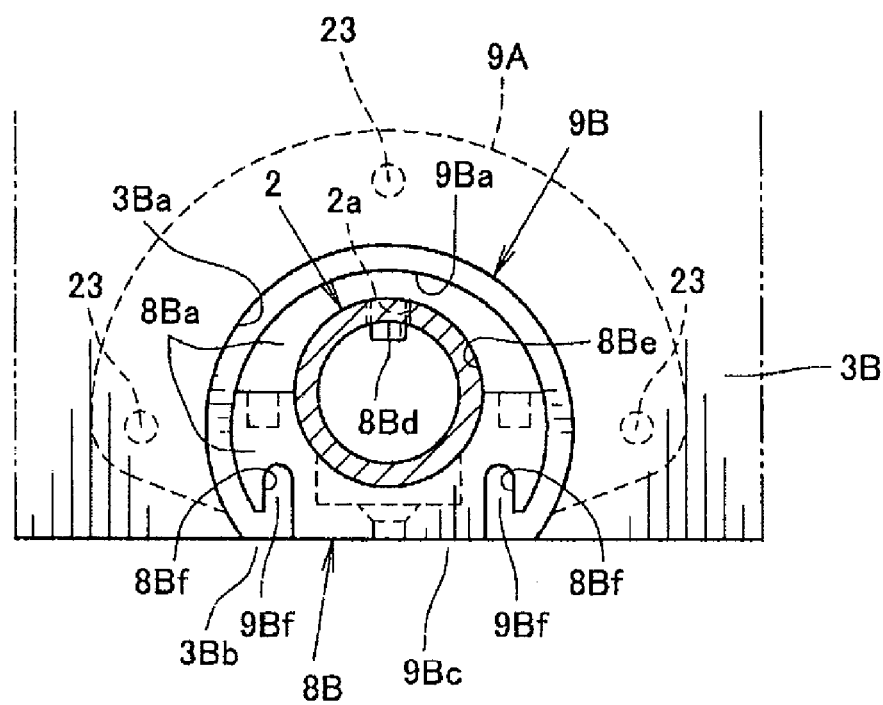
FIG. 32 is a plan view of structure of using separable insertion members.

FIG. 32 shows an assembly structure for fixing the shelf 3B and post 2 by using a separable insertion member 8B, in which rear split members 8Ba for composing the insertion member 8B are fitted to the rear outer circumference of the post 2, and protrusions 8Bd . . . formed in the receiving side 8Be of rear split member 8Ba are inserted and fixed in holes 2a . . . of the post 2.

The front split members 8Ba are fitted to the front outer circumference of the post 2, and opposite ends of split members 8Ba, 8Ba (for example, steps, protrusions, grooves) are mutually engaged, and matched and fixed. The insertion member 8B attached to the post 2 is inserted into the receiving hole 9Ba of the receiving member 9B attached to the shelf 3B from beneath, and a pair of stopping grooves 8Bf, 8Bf formed in the insertion member 8B are stopped mutually in a pair of stopping parts 9Bf, 9Bf formed in the receiving member 9B, and the same action and effect as in embodiment 2 are obtained.

The front split members 8Ba may be also fitted to the outer circumference of the post 2 same as the rear split members 8Ba. The assembly structure in FIG. 29 to FIG. 32 may be also used as the structure for fixing the panel 2B ad shelf 3B by fixing the insertion member 8B to the panel 2B. In this case, the hole corresponding to the post 2 is formed between the insertion member 8B and receiving member 9B, but the hole may be closed with closing member such as cap or lid.

Figure 33:
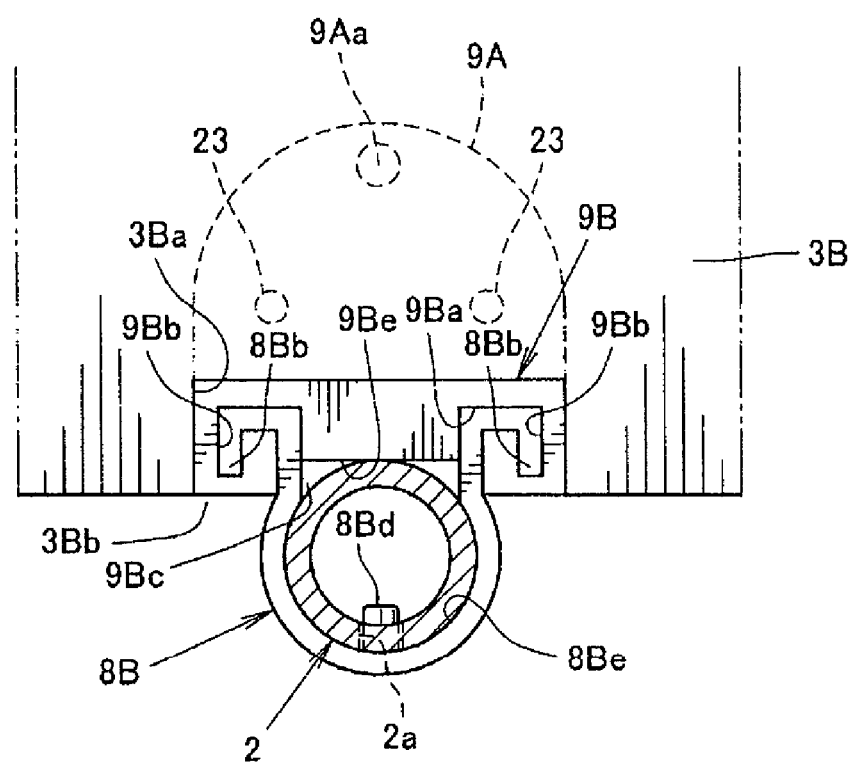
FIG. 33 is a plan view of structure of projecting and fixing a post in edge part at one side.

FIG. 33 shows an assembly structure for fixing the post 2 in a state projecting outside from one edge of the shelf 3B, in which two protrusions 8Bd, 8Bd projecting from the curved side receiving side 8Be of the insertion member 8B of U shape in a plan view are inserted and fixed in holes 2a ... of the post 2, and the insertion member 8B attached to the post 2 is inserted into the receiving hole 9Ba of the receiving member 9B attached to the shelf 3B from beneath, and a pair of stopping parts 8Bb, 8Bb formed in the insertion member 8B are stopped in a pair of stopping grooves 9Bb, 9Bb formed in the receiving member 9B, and the same action and effect as in embodiment 2 are obtained.

The curvature part of the insertion member 8B to which the post 2 is fixed is provided to project outside from the edge of the shelf 3B, and when the insertion member 8B and receiving member 9B are fitted and fixed, the post 2 having the insertion member 8B does not interfere, and the upper and lower faces of the shelf 3B having the receiving member 9B may be effectively utilized.

Figure 34:
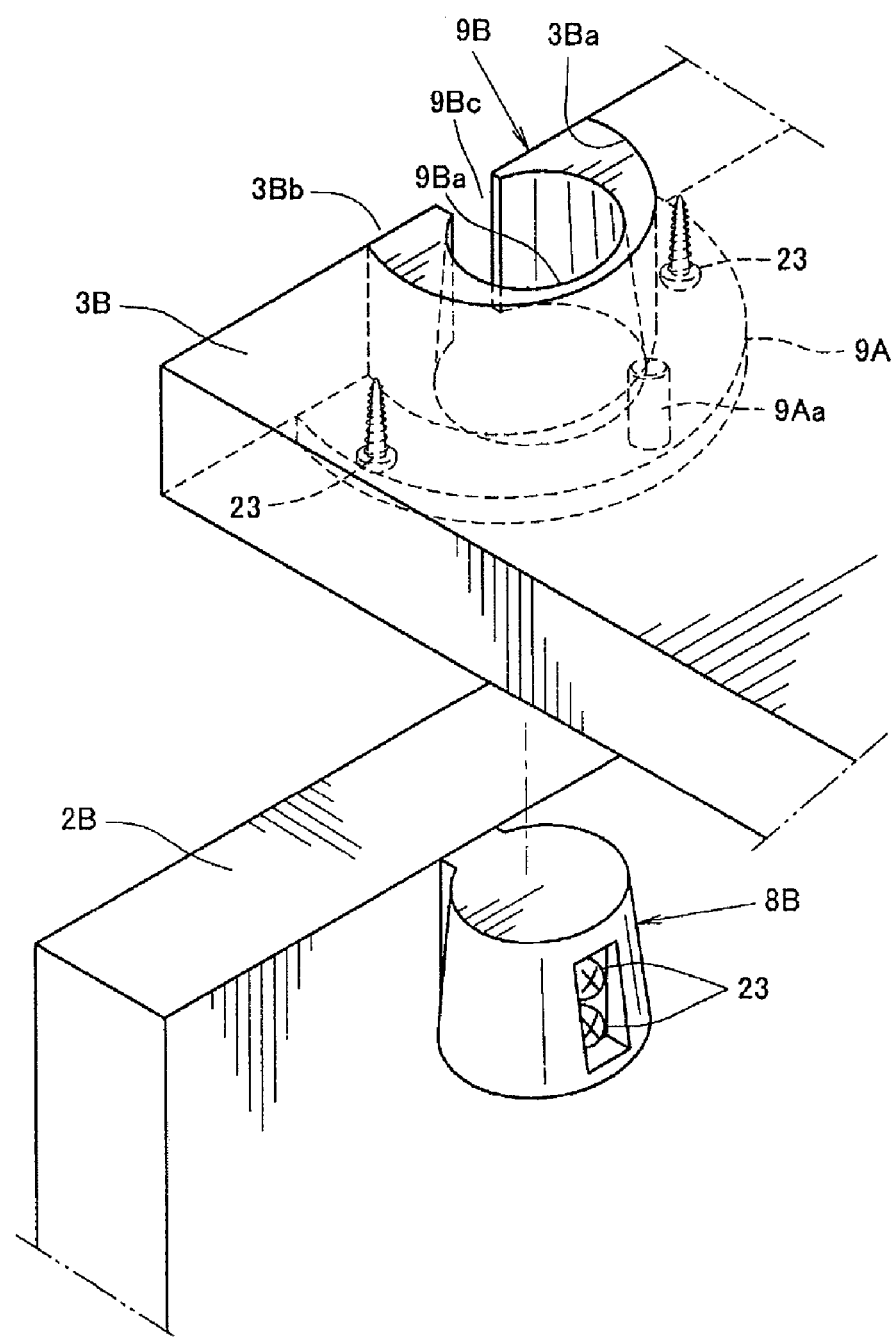
FIG. 34 is a perspective view of structure using circular trapezoidal insertion member.
Figure 35:
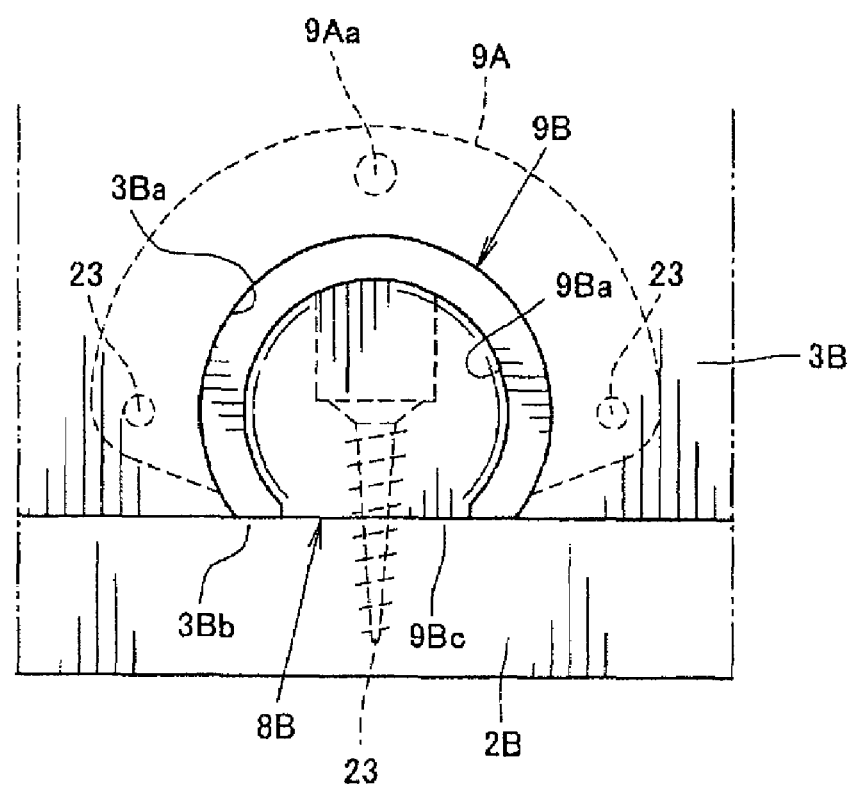
FIG. 35 is a plan view showing assembled state of insertion member and receiving member in FIG. 34.

FIG. 34 and FIG. 35 show an assembly structure for fitting the insertion member 8B of circular trapezoidal section as seen from the side into the receiving hole 9Ba of the receiving member 9B formed in size and shape conforming to the insertion member 8B, in which the outer circumference of the insertion member 8B and inner circumference of receiving hole 9Ba of the receiving member 9B are formed in a taper profile gradually reduced in diameter from the lower side larger end to the upper side smaller end.

When the insertion member 8B attached to the panel 2B is inserted into the receiving hole 9Ba of the receiving member 9B attached to the shelf 3B from beneath, the taper faces of the insertion member 8B and receiving member 9B are mutually pressed, and fixed firmly in tight state, and the same action and effect as in embodiment 2 are obtained.

Figure 36:
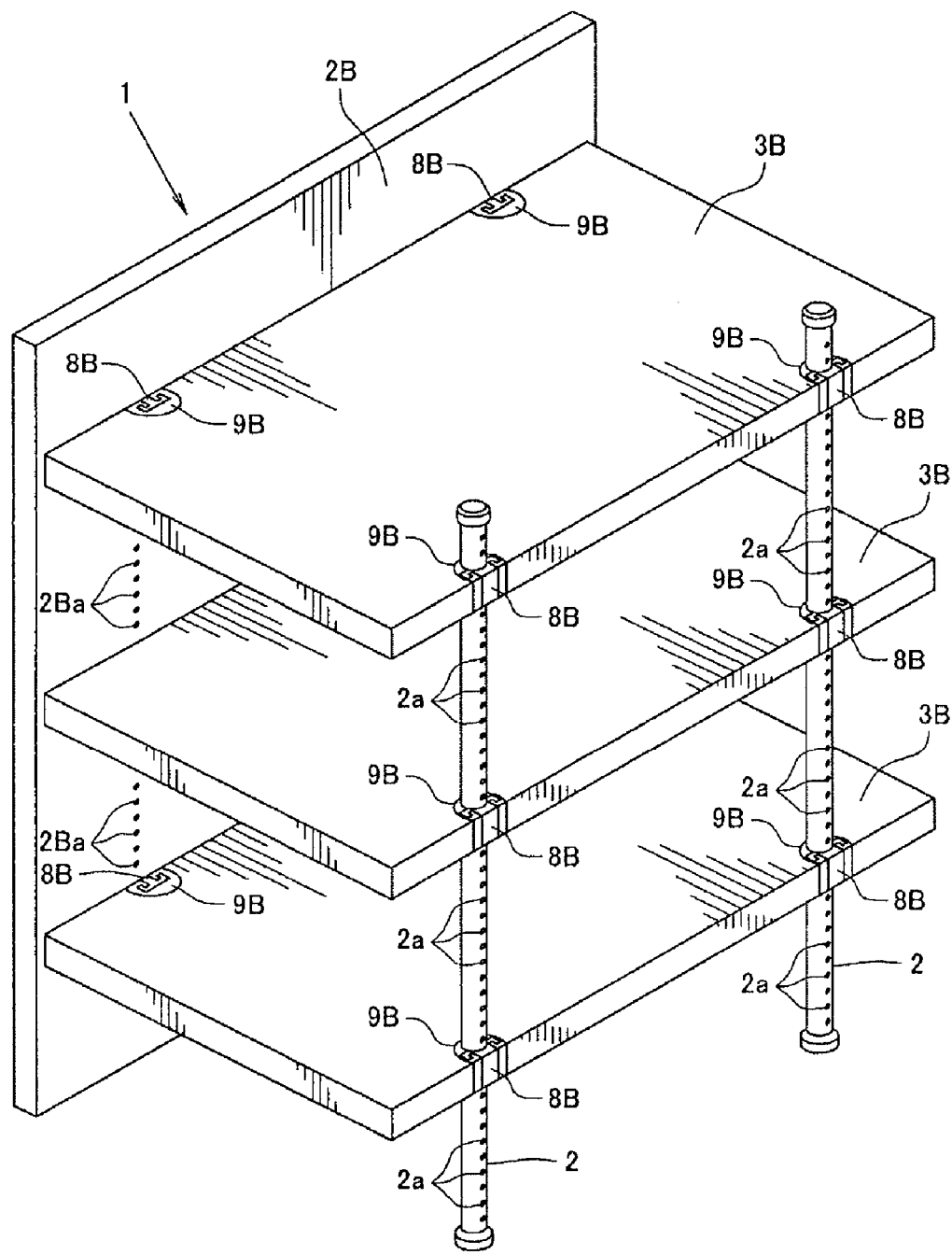
FIG. 36 is a perspective view of assembly example of structure of panel, shelf, and post.

FIG. 36 shows an assembly example of a structure 1 formed by combining one panel 2B, and a plurality of shelves 3B ... and posts 2 ... by using the assembly structure in FIG. 24 and FIG. 29, in which the insertion members 8B ... attached to the panel 2B are fitted to the receiving members 9B ... attached to one edge of the shelves 3B from beneath, and the insertion members 8B ... attached to two posts 2 ... are inserted into receiving members 9B ... attached to other edge of the shelves 3B ... from beneath, and the same action and effect as in embodiment 2 are obtained. Or an assembly structure of other example may be also used.

When changing the height of the moving shelf 3B set up at the lower side, when the shelf 3B is lifted up, the insertion member 8B can be drawn out from the receiving hole 9Ba of the receiving member 9B, and it saves time and labor for drawing out the shelf 3B set up at the upper side from the posts 2, 2, and the handling operation is simplified for attaching or detaching the shelf 3B or changing the height.

Figure 37:
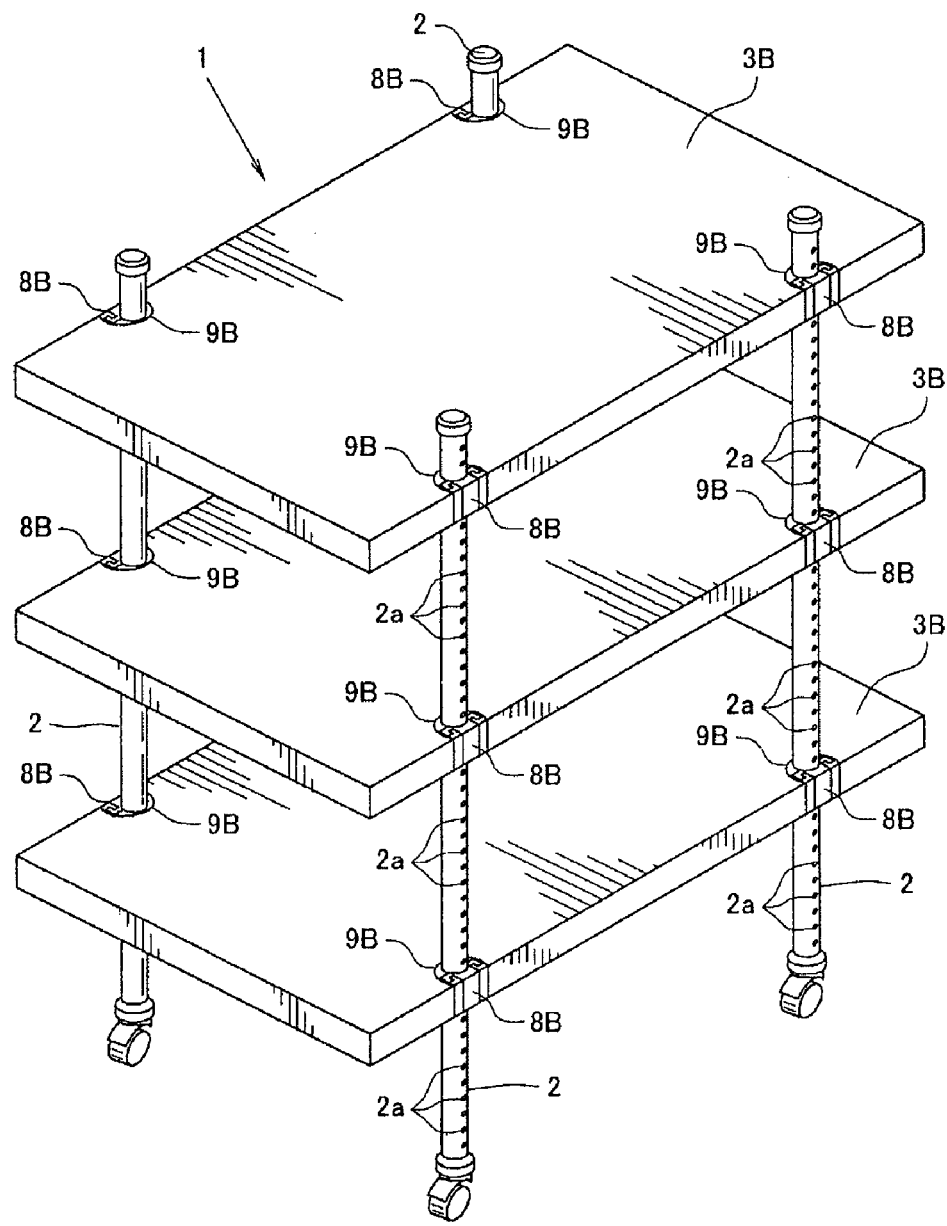
FIG. 37 is a perspective view of assembly example of structure of panel and post.

FIG. 37 shows an assembly example of a structure 1 formed by combining a plurality of shelves 3B ... and posts 2 ... by using the assembly structure in FIG. 29, in which the insertion members 8B ... attached to four posts 2 ... are inserted into receiving members 9B ... attached to both edges of the shelves 3B ... from beneath to be assembled, and the same action and effect as in embodiment 2 are obtained.

Alternatively, a caster with stopper function is provided at the lower end of the structure 1, so as to be movable in desired direction (for example, 360 degrees), or without using caster, the structure 1 may be installed directly in a desired place. Or an assembly structure of other example may be also used.

Figure 38:
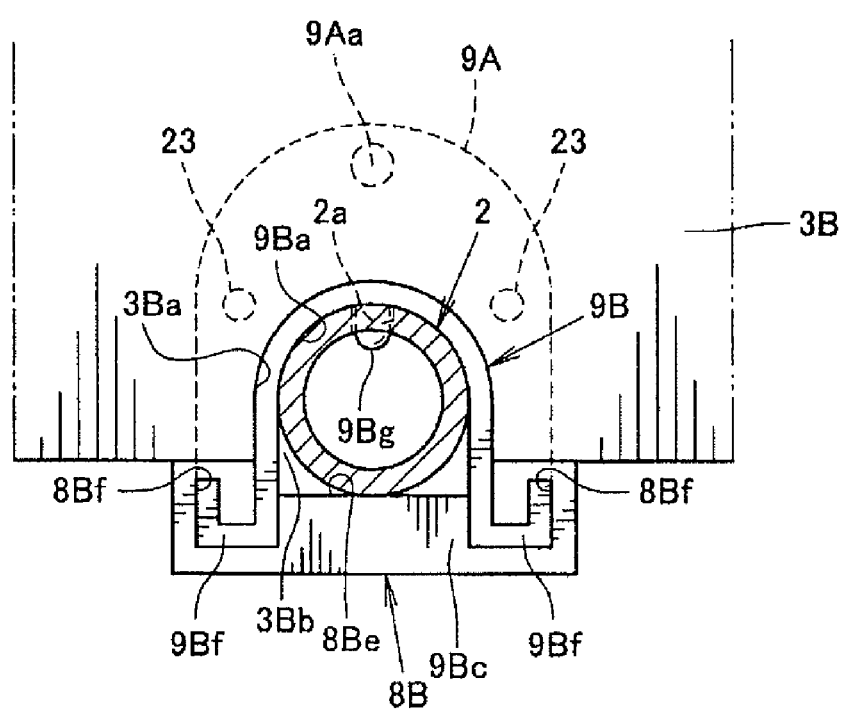
FIG. 38 is a plan view of structure for stopping the insertion member at the protruding end side of receiving member.

FIG. 38 shows other example of assembly structure for stopping insertion member 8B to the protruding end side of the receiving member 9B projecting outside from one edge of the shelf 3B from above, in which the receiving member 9B in inverted U shape as seen from a plane is fixed preliminarily to the support hole 3Ba of the shelf 3B, and stopping parts 9Bf, 9Bf of the receiving member 9B project outside from one edge of the shelf 3B.

Two protrusions 9Bg, 9Bg projecting into the receiving hole 9Ba of the receiving member 9B are inserted and fixed into hole 2a ... of the post 2 inserted into the receiving hole 9Ba from the horizontal direction. While the receiving side 8Be of the insertion member 8B is pressed to the outer circumference of the post 2 at the opposite side of the protrusion 9Bg projecting from the receiving member 9B, the stopping groves 8Bf, 8Bf of the insertion member 8B are stopped and engaged in stopping parts 9Bf, 9Bf of the receiving member 9B projecting outside from one edge of the shelf 3B from above, so that the shelf 3B and post 2 can be fixed.

In the corresponding relation of the configuration of the embodiment and the foregoing embodiments, The structural body of the invention corresponds to the post 2, panel 2B, and shelf 3B of the embodiment, Similarly, The fixing means corresponds to the screw 23, but The invention is not limited to the configuration of the illustrated embodiments alone, but may embraces many examples applied on the basis of the technical concepts of the invention as disclosed in the claims.

The invention claimed is:

1. An assembly structure for fitting and fixing insertion members attached to the post outside into receiving holes of receiving members provided in the structural body from beneath, wherein support holes for allowing the receiving members to be fitted from beneath are formed in the edge of the structural body, a notch opened in a width allowing the post to be attached and detached in the horizontal direction, and preventing the receiving member from being attached and detached in the horizontal direction is formed in the vertical direction by communicating with the support hole, in the edge of the structural body near the support hole, the outer circumference of the insertion member fitted to the post outside from the side is formed in a taper profile increasing from the upper end to the lower end, the inner circumference of the receiving hole of the receiving member is formed in a taper profile increasing from the upper end to the lower end corresponding to the outer circumference of the insertion member, and a notch opened in a width allowing the insertion member allowing the post to be attached and detached in the horizontal direction and preventing the insertion member from being attached or detached in the horizontal direction is formed in the side of the receiving member in vertical direction by communicating with the receiving hole.

2. The assembly structure of claim 1,
wherein concave parts and convex parts to be engaged with each other are formed in opposite sides of the post and insertion member, and at least either concave parts or convex parts are arranged at specific equal interval the length direction along the outside of the post.

3. The assembly structure of claim 1,
wherein a flange abutting against the peripheral edge of the support hole is formed at least in one of the lower end outer circumference and upper end outer circumference of the receiving member.

4. The assembly structure of claim 1,
wherein the lower end peripheral edge of support hole and lower end outer circumference of receiving member formed in the structural body are fixed integrally by means of fixing member.

5. The assembly structure of claim 1,
wherein the receiving member is separated vertically into an inner member fitted to the outer circumference of the insertion member, and an outer member fitted to the support hole of the structural body, and formed in a shape matching mutually.

6. The assembly structure of claim 1, further comprising:
a tightening member screwed to the lower end of the receiving member projecting beneath the support hole of the structural body, and abutting against the insertion member projecting beneath the receiving hole of the receiving member, for applying a tightening force in a direction of mutually pressing the taper faces of the insertion member and receiving member.

7. The assembly structure of claim 1,
wherein the insertion member is separated into a pair of split members formed in size and shape conforming to the hemisphere of the post.

8. The assembly structure of claim 1,
wherein the insertion member is formed in C shape as seen from a plane opened at one edge, and both ends of the opening side of the insertion member are extended in a radial direction to be intended in the interval than the outside diameter of the post.

9. The assembly structure of claim 1, further comprising:
a tightening member screwed to the upper end of the insertion member projecting above the support hole of the structural body, for applying a tightening force in a direction of mutually pressing the taper faces of the insertion member and receiving member.

10. The assembly structure of claim 9,
wherein a notch opened in a width allowing the post to be attached and detached in the horizontal direction is formed in the side of the tightening member in a vertical direction.

\* \* \* \* \*